United States Patent
Catovic et al.

(10) Patent No.: US 12,464,575 B2
(45) Date of Patent: Nov. 4, 2025

(54) APPARATUS AND METHOD OF WIRELESS COMMUNICATION BASED ON A BACK-OFF TIMER

(71) Applicant: QUALCOMM Incorporated, San Diego, CA (US)

(72) Inventors: Amer Catovic, San Diego, CA (US); Can Zhao, San Diego, CA (US); Suli Zhao, San Diego, CA (US); Lenaig Genevieve Chaponniere, La Jolla, CA (US); Ajith Tom Payyappilly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 17/185,309

(22) Filed: Feb. 25, 2021

(65) Prior Publication Data
US 2021/0274570 A1  Sep. 2, 2021

Related U.S. Application Data

(60) Provisional application No. 62/983,506, filed on Feb. 28, 2020.

(51) Int. Cl.
*H04W 76/10* (2018.01)
*H04W 28/06* (2009.01)

(52) U.S. Cl.
CPC .......... *H04W 76/10* (2018.02); *H04W 28/06* (2013.01)

(58) Field of Classification Search
CPC ..... H04W 28/06; H04W 48/18; H04W 76/10; H04W 76/18; H04W 76/22
See application file for complete search history.

(56) References Cited

U.S. PATENT DOCUMENTS

2013/0286828 A1  10/2013  Cho et al.
2019/0357118 A1*  11/2019  Kim .................. H04W 80/10
(Continued)

FOREIGN PATENT DOCUMENTS

CN         109257769 A         1/2019

OTHER PUBLICATIONS

"3rd Generation Partnership Project; Technical Specification Group Services and System Aspects; Procedures for the 5G System (5GS); Stage 2 (Release 16)", 3GPP Standard, Technical Specification, 3GPP TS 23.502, 3rd Generation Partnership Project (3GPP), Mobile Competence Centre, 650, Route Des Lucioles, F-06921 Sophia-Antipolis Cedex, France, vol. SA WG2, No. V16.3.0, Dec. 22, 2019 (Dec. 22, 2019), pp. 1-558, XP051840932, Retrieved from the Internet: URL:ftp://ftp.3gpp.org/Specs/archive/23_series/23.502/23502-g30.zip 23502-g30.docx.

(Continued)

*Primary Examiner* — Syed Ali
(74) *Attorney, Agent, or Firm* — Norton Rose Fulbright US LLP

(57) ABSTRACT

An apparatus for wireless communication includes a memory and a processor coupled to the memory. The processor is configured to send a data session establishment request to establish a data session with a network device using a wireless communication network. The data session establishment request has a first field to indicate a requested network slice for the data session. The processor is further to receive an indication of a granted network slice for the data session and to receive an indication of a back-off timer value from the network device. The processor is further configured, after expiration of a back-off timer based on the back-off timer value, to send a first message associated with the granted network slice and to send a second message (Continued)

having a second field corresponding to the first field of the data session establishment request.

25 Claims, 12 Drawing Sheets

(56) References Cited

U.S. PATENT DOCUMENTS

| | | | | |
|---|---|---|---|---|
| 2020/0137621 | A1* | 4/2020 | Yang | H04W 28/0289 |
| 2021/0092634 | A1* | 3/2021 | Kang | H04W 28/0289 |
| 2021/0136589 | A1* | 5/2021 | Kawasaki | H04W 12/08 |
| 2021/0211970 | A1* | 7/2021 | Lee | H04W 48/06 |
| 2021/0251020 | A1* | 8/2021 | Aramoto | H04W 76/25 |
| 2021/0360723 | A1* | 11/2021 | Takakura | H04W 48/18 |
| 2022/0015174 | A1* | 1/2022 | Aramoto | H04W 76/18 |
| 2022/0201549 | A1* | 6/2022 | Kawasaki | H04W 60/04 |
| 2022/0201788 | A1* | 6/2022 | Kawasaki | H04W 76/18 |
| 2022/0386224 | A1* | 12/2022 | Kawasaki | H04W 48/16 |
| 2023/0053127 | A1* | 2/2023 | Sugawara | H04W 24/04 |
| 2023/0085363 | A1* | 3/2023 | Kim | H04W 76/18 455/411 |
| 2023/0189132 | A1* | 6/2023 | Kim | H04W 88/18 455/435.1 |

OTHER PUBLICATIONS

Ericsson: "5G SM—PDU Session Establishment Procedure - Message Content", 3GPP Draft, C1-172000-V02, 3GPP TSG-CT WG1 Meeting #104, 3rd Generation Partnership Project (3GPP), Mobile Competence Centre, 650, Route Des Lucioles, F-06921, Sophia-Antipolls Cedex, FRANCE vol. CT WG1, No. Zhangjiajie, P.R of China, May 15, 2017-May 19, 2017, May 8, 2017 (May 8, 2017), XP051260540, 7 Pages, Retrieved from the Internet: URL:http://www.3gpp.org/ftp/tsg_ct/WG1_mm-cc-sm_ex-CN1/TSGC1_104_ZhangjiaJie/Docs/.
Huawei, et al., "Behavior When S-NSSAI in PDU Session Establishment Accept is Different from S-NSSAI in UL NAS Transport Message", 3GPP Draft, 3GPP TSG-CT WG1 Meeting #114, C1-190169_Requested_NSSAI, 3rd Generation Partnership Project (3GPP), Mobile Competence Centre, 650, Route Des Lucioles, F-06921 Sophia-Antipolis Cedex, France vol. CT WG1, No. Bratislava, Slovakia, Jan. 21, 2019-Jan. 25, 2019, Jan. 14, 2019 (Jan. 14, 2019), XP051592144, 7 Pages, Retrieved from the Internet: URL:http://www.3gpp.org/ftp/Meetings%5F3GPP%5FSYNC/CT1/Docs/C1%2D190169%2Ezip.
Huawei, et al., "Consistent Back Off Timer Handling for EPC Interworking", 3GPP Draft, C1-196559, 3GPP TSG-CT WG1 Meeting #120, 3rd Generation Partnership Project (3GPP), Mobile Competence Centre, 650, Route Des Lucioles, F-06921 Sophia-Antipolis Cedex, France vol. CT WG1, No. Portoroz (Slovenia), Oct. 7, 2019-Oct. 11, 2019, Dec. 2, 2019 (Dec. 2, 2019), XP051833560, 12 Pages, Retrieved from the Internet: URL:https://ftp.3gpp.org/tsg_ct/TSG_CT/TSGC_86_Sitges/Docs/CP-193094.zip24501_CR1339r2_(Rel-16)_C1-196559_.docx.
Intel, et al., "Clarification on NAS Level Congestion Control", 3GPP Draft, 3GPP TSG-SA WG2 Meeting #131, 23501_CR0834R8_5GS_PH1_(REL-15)_S2-1902804(WAS2682)_NAS_CONGESTTON_CONTROL V1, 3rd Generation Partnership Project (3GPP), Mobile Competence Centre, 650, Route Des Lucioles, F-06921, SOP, vol. SA WG2, No. Santa Cruz—Tenerife, Spain, Feb. 25, 2019-Mar. 1, 2019, Mar. 14, 2019 (Mar. 14, 2019), XP051697034, 6 Pages, Retrieved from the Internet: URL:http://www.3gpp.org/ftp/tsg%5Fsa/TSG%5FSA/TSGS%5F83/Docs/SP%2D190155%2Ezip.
International Search Report and Written Opinion—PCT/US2021/019791—ISA/EPO—Jun. 11, 2021.
Qualcomm Incorporated: "5GSM Congestion Timers Apply to Data Transfer Over Control Plane", 3GPP Draft, C1-200420, 3GPP TSG-CT WG1 Meeting #122-e, 3rd Generation Partnership Project (3GPP), Mobile Competence Centre, 650, Route Des Lucioles, F-06921 Sophia-Antipolis Cedex, France vol. CT WG1 No. Electronic Meeting, Feb. 20, 2020-Feb. 28, 2020, Feb. 17, 2020 (Feb. 17, 2020), XP051847711, 3 Pages, Retrieved from the Internet: URL:https://ftp.3gpp.org/tsg_ct/WG1_mm-cc-sm_ex-CN1/TSGC1_122e/Docs/C1-200420.zip.
Huawei, et al., "Consistent Back off Timer Handling for EPC Interworking", C1-196347, 3GPP TSG-CT WG1 Meeting #120, Portoroz (Slovenia), Oct. 7-11, 2019, 12 Pages.

* cited by examiner

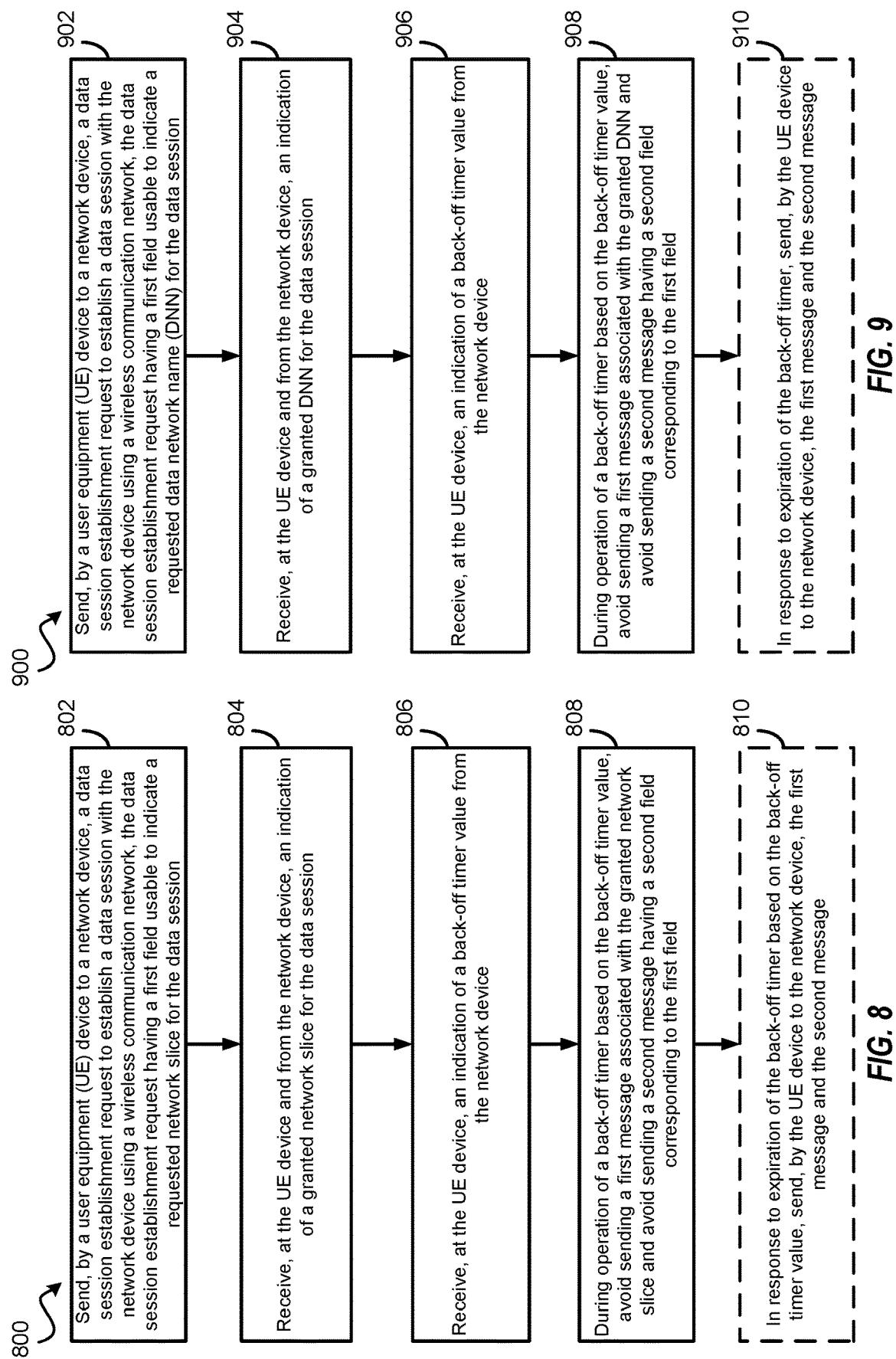

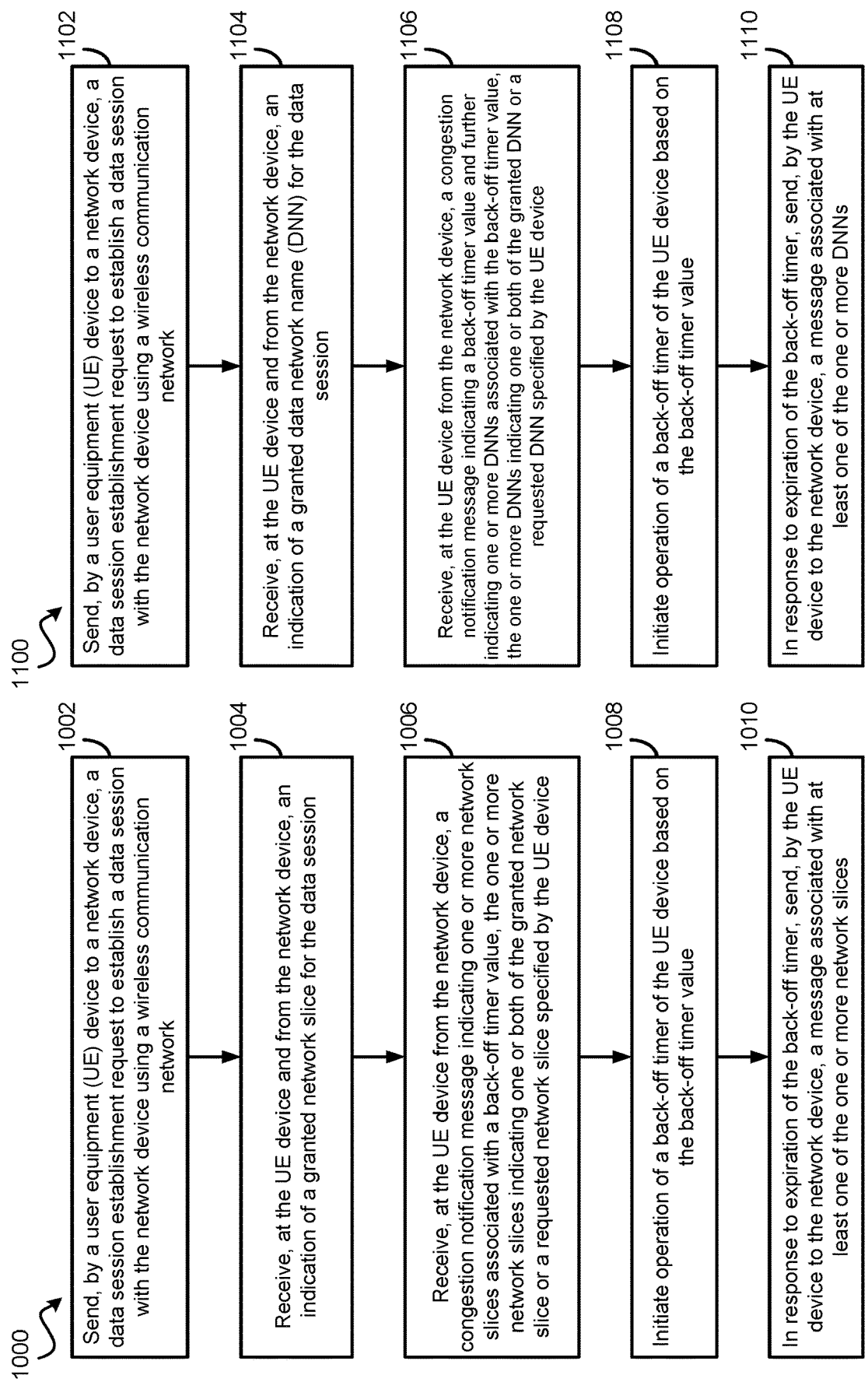

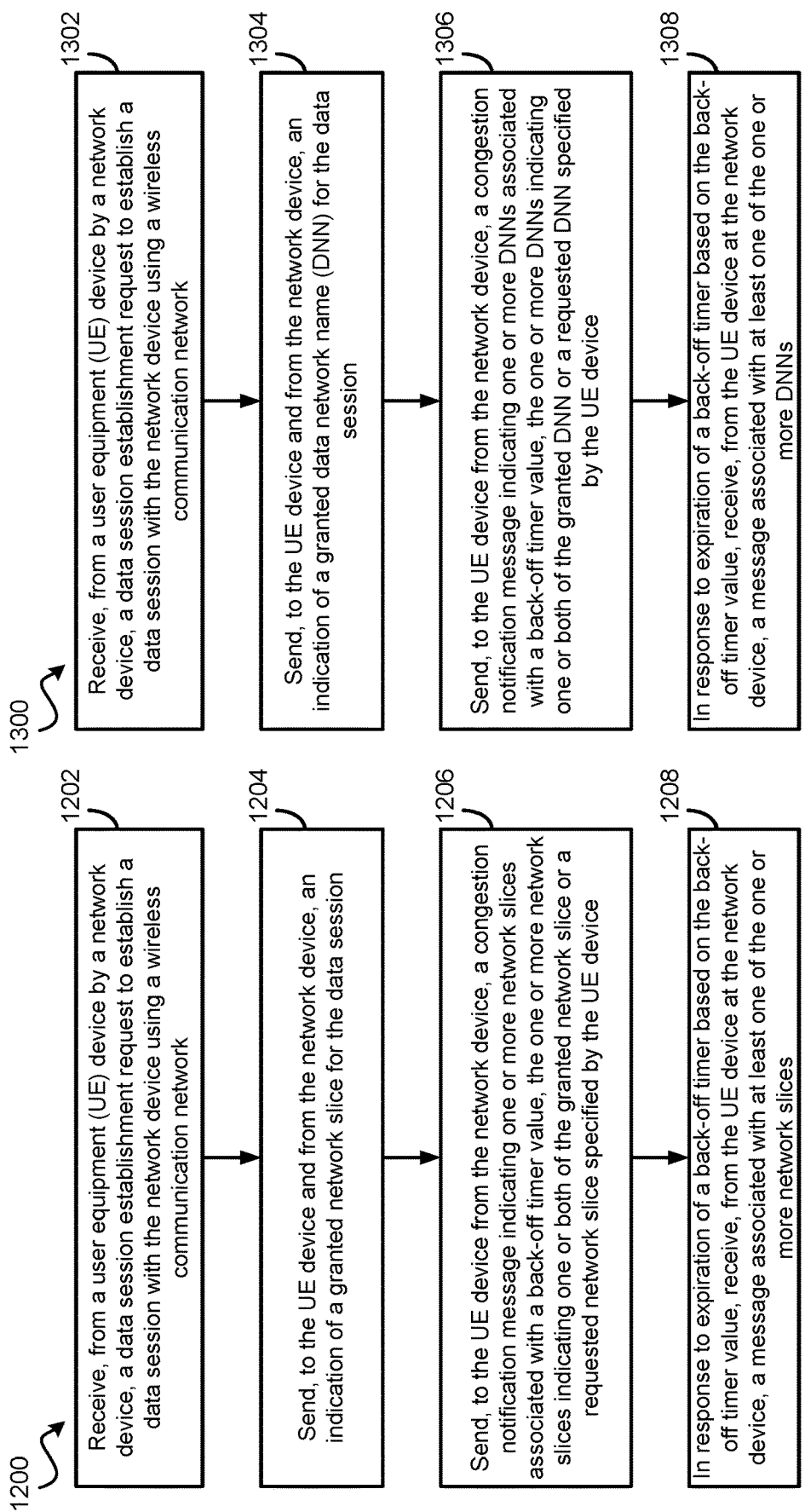

APPARATUS AND METHOD OF WIRELESS COMMUNICATION BASED ON A BACK-OFF TIMER

CROSS-REFERENCE TO RELATED APPLICATIONS

This application claims the benefit of U.S. Prov. Pat. App. No. 62/983,506, entitled "APPARATUS AND METHOD OF WIRELESS COMMUNICATION BASED ON A BACK-OFF TIMER," filed on Feb. 28, 2020, which is incorporated by reference herein in its entirety.

TECHNICAL FIELD

Aspects of the present disclosure relate generally to wireless communication systems, and more particularly, to wireless communication systems that communicate based on back-off timers.

DESCRIPTION OF THE RELATED TECHNOLOGY

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, an apparatus for wireless communication includes a memory and a processor coupled to the memory. The processor is configured to send a data session establishment request to establish a data session with a network device using a wireless communication network. The data session establishment request has a first field to indicate a requested network slice for the data session. The processor is further configured to receive an indication of a granted network slice for the data session and to receive an indication of a back-off timer value from the network device. The processor is further configured to send a first message associated with the granted network slice after expiration of a back-off timer based on the back-off timer value and to send a second message having a second field corresponding to the first field of the data session establishment request after the expiration of the back-off timer based on the back-off timer value.

In some other aspects of the disclosure, a method of wireless communication includes sending, by a user equipment (UE) device, a data session establishment request to establish a data session with a network device using a wireless communication network. The data session establishment request has a first field to indicate a requested data network name (DNN) for the data session. The method further includes receiving, at the UE device, an indication of a granted DNN for the data session and receiving, at the UE device, an indication of a back-off timer value from the network device. The method further includes, after expiration of a back-off timer based on the back-off timer value, sending a first message associated with the granted DNN and sending a second message having a second field corresponding to the first field of the data session establishment request.

In some other aspects of the disclosure, an apparatus for wireless communication includes a memory and a processor coupled to the memory. The processor is configured to receive a data session establishment request to establish a data session with a user equipment (UE) device using a wireless communication network and to send an indication of a granted network slice for the data session. The processor is further configured to send a congestion notification message indicating one or more network slices associated with a back-off timer value. The one or more network slices indicate one or both of the granted network slice or a requested network slice specified by the UE device. The processor is further configured to receive, in response to expiration of a back-off timer based on the back-off timer value, a message associated with at least one of the one or more network slices.

In some other aspects of the disclosure, a method of wireless communication includes receiving, by a network device, a data session establishment request to establish a data session with a user equipment (UE) device using a wireless communication network. The method further includes sending, by the network device, an indication of a granted data network name (DNN) for the data session and sending, by the network device, a congestion notification message indicating one or more DNNs associated with a back-off timer value. The one or more DNNs indicate one or both of the granted DNN or a requested DNN specified by the UE device. The method further includes receiving, at the network device in response to expiration of a back-off timer based on the back-off timer value, a message associated with at least one of the one or more DNNs.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 8 is a block diagram illustrating an example of a method of operation of a UE that may be performed to send a message associated with a network slice based on operation of a back-off timer according to some aspects of the present disclosure.

FIG. 9 is a block diagram illustrating an example of a method of operation of a UE that may be performed to send a message associated with a DNN based on operation of a back-off timer according to some aspects of the present disclosure.

FIG. 10 is a block diagram illustrating another example of a method of operation of a UE that may be performed to send a message associated with a network slice based on operation of a back-off timer according to some aspects of the present disclosure.

FIG. 11 is a block diagram illustrating another example of a method of operation of a UE that may be performed to send a message associated with a DNN based on operation of a back-off timer according to some aspects of the present disclosure.

FIG. 12 is a block diagram illustrating an example of a method of operation of a network device that may be performed to indicate association of a back-off timer with one or more network slices according to some aspects of the present disclosure.

FIG. 13 is a block diagram illustrating an example of a method of operation of a network device that may be performed to indicate association of a back-off timer with one or more DNNs according to some aspects of the present disclosure.

DETAILED DESCRIPTION

Figure 1:
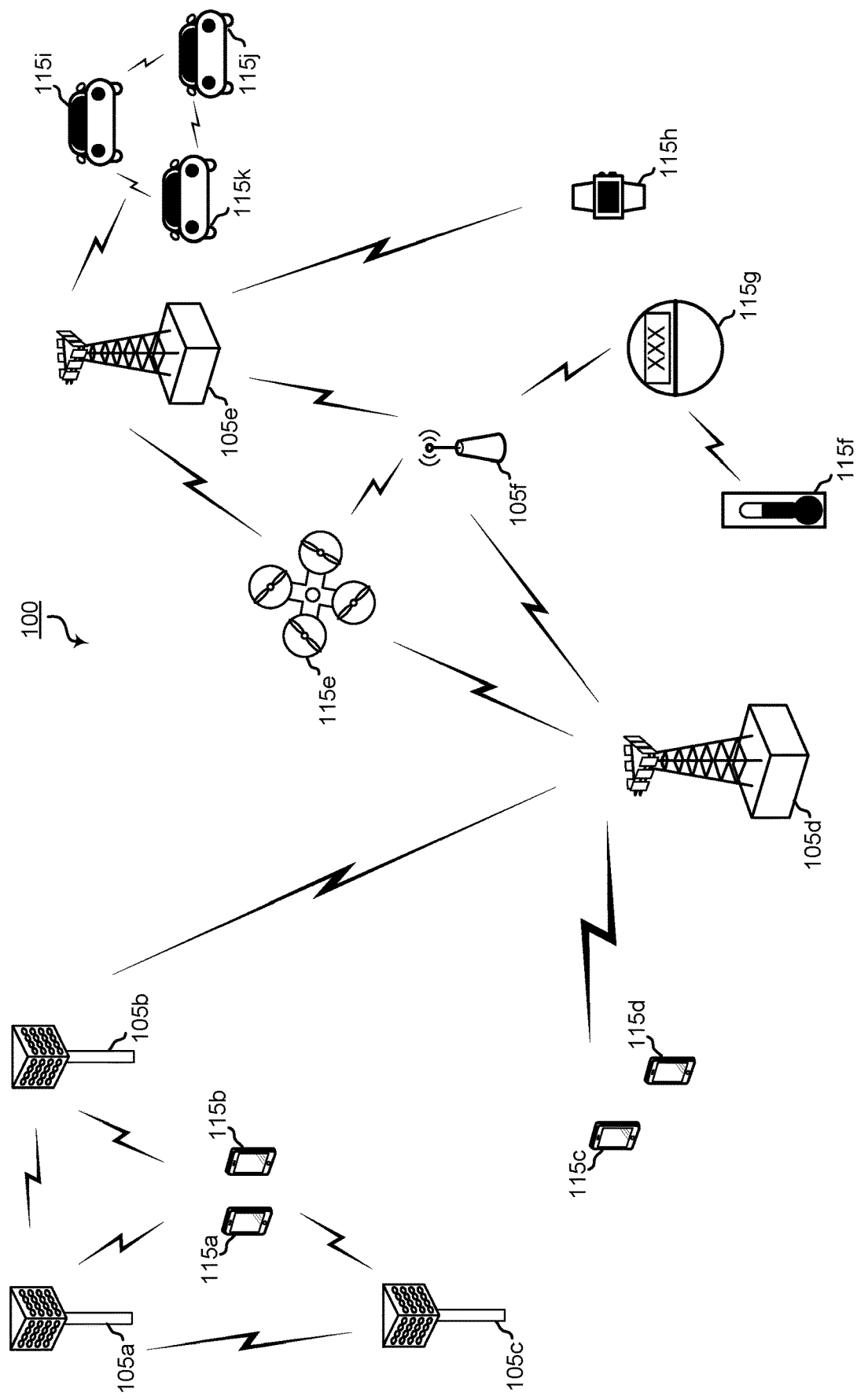
FIG. 1 is a block diagram illustrating details of a wireless communication system configured to perform wireless communication based on a back-off timer according to some aspects of the present disclosure.

A wireless communication system may include devices that use data sessions to communicate messages, data, and other information. A data session may be conducted by a user equipment (UE) device and a network device (e.g., a base station) to enable communication between the UE and a device (e.g., a server) of a data network that is associated with a data network name (DNN). An example of a data session is a protocol data unit (PDU) session (also referred to herein as a packet data unit session).

In some examples, a UE device and a network device perform operations of a data session in accordance with a protocol (e.g., a fifth-generation session management (5GSM) communication protocol) that specifies network "slices" of the wireless communication system. A network slice may refer to a selection or allocation of network resources. For example, to support a data session, a network device may select and allocate, to a UE, a set (or "slice") of network resources of the wireless communication system.

During the data session, in some cases, the network device may provide a back-off timer value to the UE. The back-off timer value may indicate a duration during which the UE is to avoid sending certain communications to the network device, such as communications associated with the data session. In some examples, the network device provides the back-off timer value to the UE in response to detecting one or more network congestion conditions associated with the wireless communication system, such as an amount or type of network congestion.

In some cases, the network slice may change during the data session. For example, newer wireless communication protocols may allow (or encourage) change of network slices to enable efficient allocation of network resources. As an example, a data session establishment request sent by the UE to the network device may specify a requested network slice (or no network slice), and a data session establishment acceptance message sent by the network device to the UE may establish a granted network slice that is different than the requested network slice (e.g., due to unavailability of the requested network slice). As a result, in some wireless communication systems, one or more devices may not "agree" on which network slice (e.g., the requested network slice or the granted network slice) to which the back-off timer value applies, resulting in poor network resource allocation in some cases (e.g., where a device avoids sending a message associated with a certain network slice despite being eligible to send the message, or where a device sends a message associated with a certain network slice despite being ineligible to do so).

A first example of a technique in accordance with some aspects of the disclosure applies the back-off timer value to both the requested network slice (if any) and to the granted network slice. For example, while counting down from (or up to) the back-off timer value, a UE may delay sending one or more messages associated with the requested network slice (if any) and may also delay sending one or more messages associated with the granted network slice. Upon expiration of the back-off timer, the UE may send the one or more messages associated with the requested network slice, the one or more messages associated with the granted network slice, or both. In the first example, the UE device may be configured to "assume" that the back-off timer value applies to both the requested network slice (if any) and to the granted network slice.

In a second example of a technique in accordance with some aspects of the disclosure, the network device provides at least one indication of a network slice to which the back-off timer value does or does not apply. For example, certain bits of a 5GSM congestion re-attempt information element (IE) message may indicate whether a back-off timer value applies (or does not apply) to a requested network slice, whether a back-off timer value applies (or does not apply) to a granted network slice, or both.

Alternatively or in addition, operations associated with the first example or the second example may be performed with respect to DNNs. For example, in some cases, a DNN may change during a data session (e.g., where a granted DNN differs from a requested DNN). In one example, a UE device may be configured to "assume" that the back-off timer value applies to both the requested DNN (if any) and to the granted DNN. In some other examples, a network device provides at least one indication of a network slice to which the back-off timer value does or does not apply. For example, certain bits of a 5GSM congestion re-attempt IE message may indicate whether a back-off timer value applies (or does not apply) to a requested DNN, whether a back-off timer value applies (or does not apply) to a granted DNN, or both.

In some implementations, a network entity (e.g., a base station or other device) may dynamically select the first example or the second example based on one or more criteria. In some deployments, the first example may be more advantageous in connection with a first wireless communication protocol that does not permit changes in network slices (or DNNs) during data sessions. In this case, the network entity may select operation based on the first example in response to detecting that a threshold number of UEs that communicate using the first wireless communication protocol. In some other deployments, the second example may be more advantageous in connection with a second wireless communication protocol that permits changes in network slices (or DNNs) during data sessions. In this case, the network entity may select operation in accordance with the second example in response to detecting that a threshold number of UEs that communicate using the second wireless communication protocol.

Alternatively or in addition, in some implementations, the network entity may select the first example or the second example based at least in part on a number of default session management functions (SMFs) of the network that process requests not specifying a network slice (or DNN). For example, with a greater number of SMFs in the network, blocking requests that do not specify a network slice (or DNN) may be unnecessary, which may make operation according to the second example more advantageous as compared to operation according to the first example in some cases. As a result, the network entity may be configured to select operation according to the first example in response to detecting that a number of default SMFs in the network fails to satisfy (e.g., is less than) a threshold and to select operation according to the second example in response to detecting that the number of default SMFs in the network satisfies (e.g., is greater than or equal to) the threshold.

By determining or indicating one or more network slices or DNNs in accordance with some aspects of the disclosure, network resource allocation may be improved. For example, a wireless communication system in accordance with some aspects of the disclosure may reduce or avoid situations in which a device avoids sending a message (e.g., prior to expiration of a back-off timer) that is associated with a certain network slice despite being eligible to send the message. As another example, a wireless communication system in accordance with some aspects of the disclosure may reduce or avoid situations in which a device sends a message associated with a certain network slice despite being ineligible to do so (e.g., prior to expiration of a back-off timer).

Further, in some cases, user experience may be improved by determining or indicating one or more network slices or DNNs in accordance with some aspects of the disclosure. To illustrate, a user may initiate an operation subject to the back-off timer, such as by loading an application that is to use the requested network slice, the granted network slice, the requested DNN, or the granted DNN. In this case, in response to determining that the user-initiated operation is subject to operation of the back-off timer, the UE may present a notification alerting the user that the user-initiated operation is subject to operation of the back-off timer. In some cases, the notification may indicate a time until the operation can be completed (e.g., by indicating a current value of the back-off timer). As a result, the user may be alerted sooner as compared to certain conventional techniques that attempt to perform the operation and then wait until the operation fails or "times out" (e.g., due to failure to receive a response to a message indicating a network slice or DNN that is subject to the back-off timer).

The detailed description, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to wireless communications systems, also referred to as wireless communications networks. In various examples, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.99999% reliability), ultra-low latency (e.g., ~1 ms), and users with wide ranges of mobility or lack thereof, and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be implemented in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
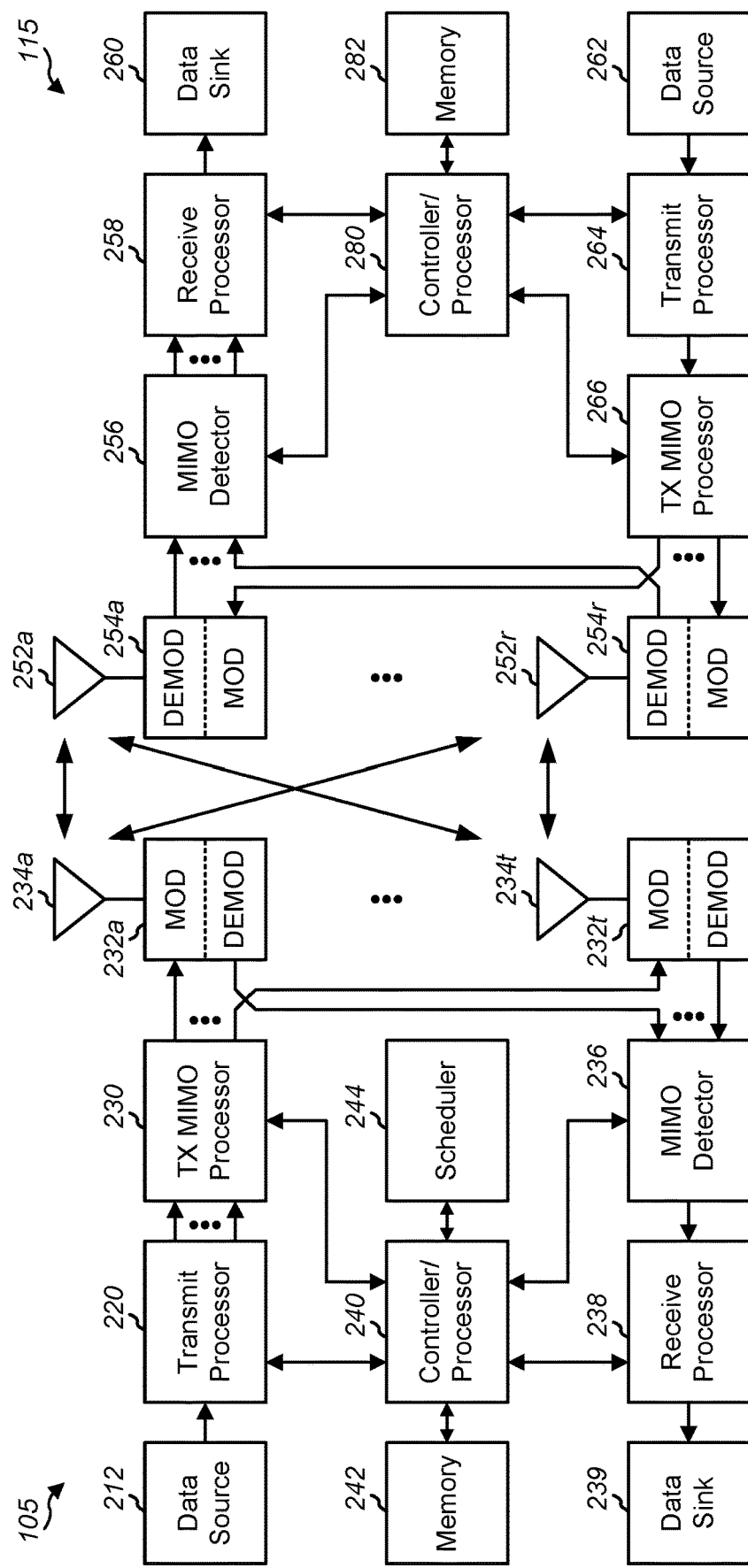
FIG. 2 is a block diagram illustrating a design of a base station and a UE configured that are configured to perform wireless communication based on a back-off timer according to some aspects of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 8-13 and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5g network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
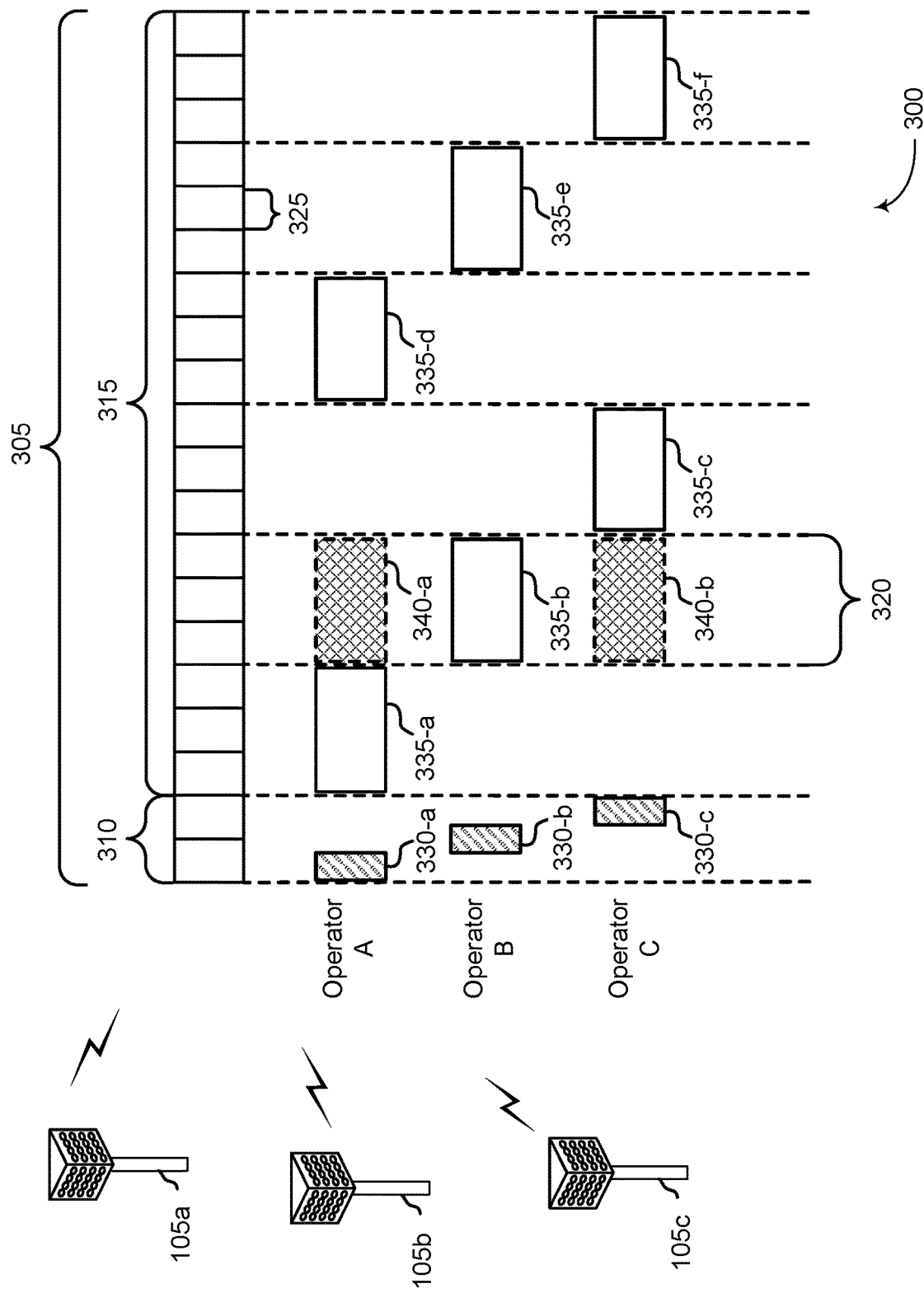
FIG. 3 is a block diagram illustrating a wireless communication system including base stations that use directional wireless beams and that perform wireless communication based on a back-off timer according to some aspects of the present disclosure.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, (e.g., G-INT-OpB), resources 335-c (e.g., G-INT-OpC) may be prioritized for Operator C, resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT (e.g., resources 335-*b*), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-*b* (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some examples, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Figure 4:
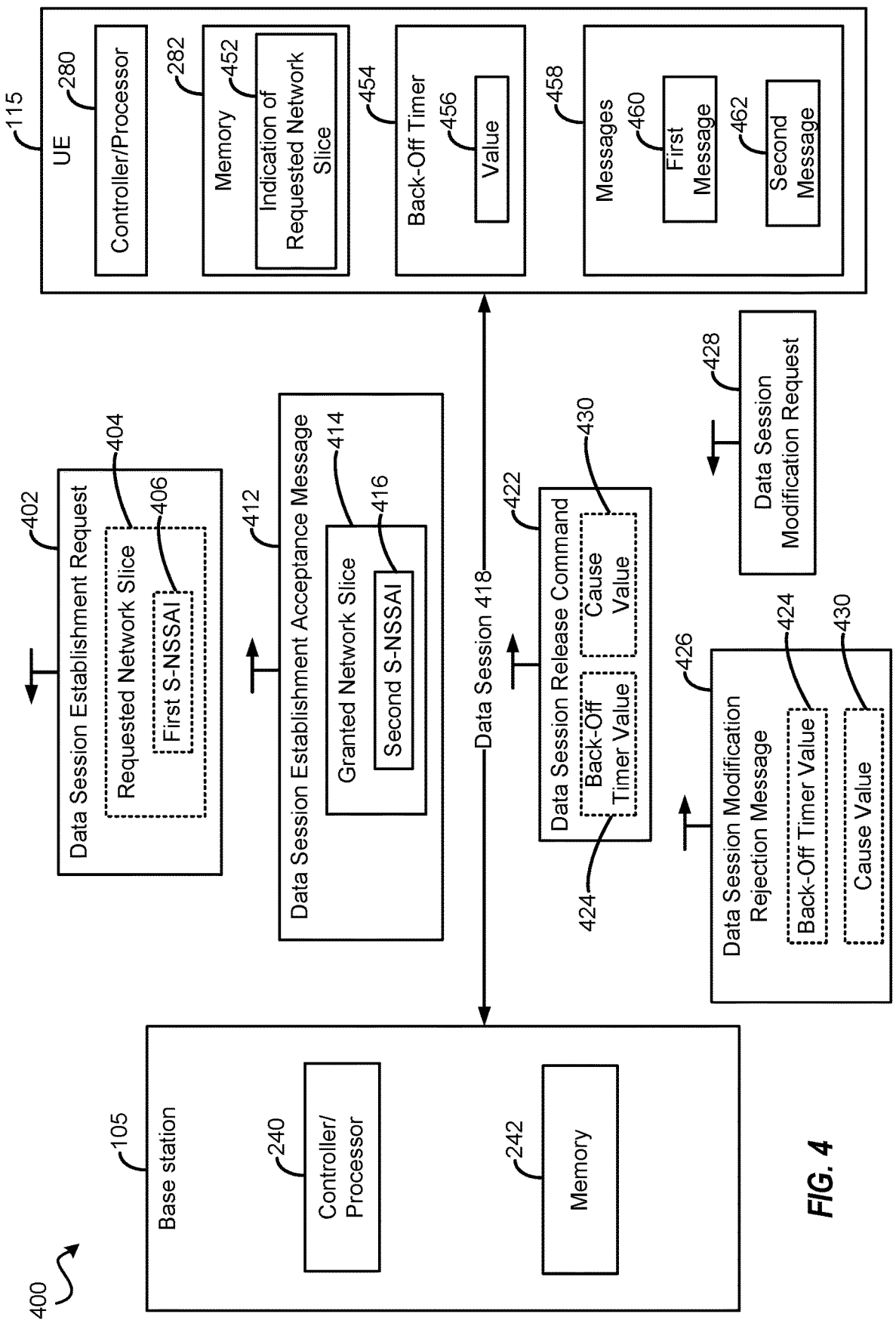
FIG. 4 is a block diagram illustrating an example of a wireless communication system configured to perform wireless communications related to network slices based on a back-off timer according to some aspects of the present disclosure.

Referring to FIG. 4, a particular illustrative example of a wireless communication system to perform wireless communications based on a back-off timer is depicted and generally designated 400. The wireless communication system 400 may include a network device (e.g., the base station 105) and the UE 115. Although a single base station 105 and a single UE 115 are shown in FIG. 4 for illustration, the wireless communication system 400 may include a different number of base stations 105, a different number of UEs 115, or a combination thereof.

During operation, the UE 115 may communicate with the base station 105 via one or more wireless communication channels of the wireless communication system 400. For example, the UE 115 may place a call via the base station 105, may communicate with one or more servers via the base station 105 (e.g., to access the Internet or another network), may perform one or more other operations, or a combination thereof. Alternatively or in addition, the base station 105 may push data, notifications, or other information to the UE via one or more wireless communication channels of the wireless communication system 400.

In some cases, the base station 105 or the UE 115 may initiate a data session 418 between the UE 115 and a device (e.g., a server) of a data network. An example of the data session 418 is a protocol data unit (PDU) session (also referred to herein as a packet data unit session). A data network may be associated with or may correspond to a data network name (DNN). In some examples, the base station 105 and the UE 115 perform operations of the data session 418 in accordance with a fifth-generation session management (5GSM) communication protocol.

The base station 105 may be configured to support the data session 418 by assigning a network slice to the UE 115. A network slice may refer to a selection or allocation of network resources. For example, to support the data session 418, the base station 105 may select and allocate, to the UE 115, a set of network resources of the wireless communication system 400.

To further illustrate, the UE 115 may send to the base station a data session establishment request 402 (e.g., a PDU session establishment request message) to establish the data session 418. The UE 115 may send the data session establishment request 402 in response to executing a certain application or program that specifies establishment of the data session 418, as an illustrative example.

In some examples, the data session establishment request 402 indicates a requested network slice 404. For example, the data session establishment request 402 may include a first single network slice selection assistance information (S-NSSAI) 406 indicating the requested network slice 404. In some other examples, the data session establishment request 402 does not indicate any requested network slice. In this case, the data session establishment request 402 may not include the first S-NSSAI 406. For example, the data session establishment request 402 may include a first field usable or configured to indicate the requested network slice 404 (e.g., by including the first S-NSSAI 406). In some cases, the UE 115 may omit the first S-NSSAI 406 from the first field (e.g., where the first field is "empty" and does not specify a requested network slice 404).

The base station 105 may send, to the UE 115, a data session establishment acceptance message 412 (e.g., a PDU session establishment accept message) indicating a granted network slice 414 for the data session 418. In some examples, the data session establishment acceptance message includes a second S-NSSAI 416 indicating the granted network slice 414. The granted network slice 414 may be different than the requested network slice 404, and the second S-NSSAI 416 may be different than the first S-NSSAI 406.

The UE 115 and the base station 105 may perform one or more operations associated with the data session 418 in accordance with the granted network slice 414. For example, the granted network slice 414 may be associated with one or more quality-of-service (QoS) parameters, and operations of the data session 418 may be performed in accordance with the one or more QoS parameters.

In response to receiving the data session establishment acceptance message 412, the UE 115 may be configured to store an indication 452 of the requested network slice 404 to a memory of the UE 115, such as the memory 282 of FIG. 2.

In some cases, the UE 115 may detect a session event (e.g., a session modification or termination event) associated with the data session 418. The session event may be initiated by the base station 105 or by the UE 115. The session event may be a congestion-based event (e.g., based on a number of UEs 115 accessing resources of the wireless communication system 400).

To illustrate, in one example, the session event includes receiving a data session release command 422 from the base station 105. In some cases, the base station 105 sends the data session release command 422 to the UE 115 in response to a threshold period of inactivity of the data session 418. In this example, the base station 105 may terminate the data session 418 by sending the data session release command 422 to the UE 115.

In another example, the session event includes sending, by the UE 115, a data session modification request 428 to the base station 105. For example, execution of a certain program or application may specify that the UE 115 is to modify (or request modification of) the data session 418. To further illustrate, the UE 115 may generate the data session modification request 428 in response to execution of a certain program or application specifying a change in one or more QoS parameters, such as in response to modification of a voice call to a video call, as an illustrative example. Depending on the particular example, the base station 105 may accept the data session modification request 428 or may reject the data session modification request 428, such as by sending a data session modification rejection message 426 to the UE 115.

In some cases, a handover event may trigger one or more of the data session release command 422 or the data session modification request 428. For example, a handover from a 4G cell to a 5G cell (or vice versa) may be associated with a change in QoS parameters. As a result, in some cases, the base station 105 may terminate the data session 418 by sending the data session release command 422, or the UE 115 may request modification of the data session 418 by sending the data session modification request 428.

The base station 105 is configured to indicate a back-off timer value 424 to the UE 115. For example, the base station 105 may detect a network congestion event associated with the wireless communication system 400 and may send the back-off timer value 424 to the UE 115 in response to detecting the network congestion event. To further illustrate, in one example, the data session release command 422 indicates the back-off timer value 424. In another example, the data session modification rejection message 426 indicates the back-off timer value 424.

The UE 115 is configured to initiate operation of a back-off timer 454 of the UE 115 in response to receiving the indication of the back-off timer value 424. For example, the UE 115 may reset a value 456 of the back-off timer 454. In some examples, operating the back-off timer 454 includes initializing the value 456 to zero (or another number) and counting up to the back-off timer value 424. In this case, the back-off timer 454 may expire upon the value 456 reaching the back-off timer value 424. In some other examples, operating the back-off timer 454 includes initializing the value 456 to the back-off timer value 424 and counting down to zero (or another number). In this case, the back-off timer 454 may expire upon the value 456 reaching zero (or another number).

In some examples, the UE 115 is configured to delay sending one or more messages associated with the requested network slice 404 or the granted network slice 414 during a time interval that begins upon initiating the operation of the back-off timer 454 and that ends upon the expiration of the back-off timer 454. In some examples, delaying sending the one or more messages may reduce network congestion at the wireless communication system 400.

To further illustrate, the UE 115 may store, during operation of the back-off timer 454, messages 458 associated with the requested network slice 404 or the granted network slice 414. For example, the messages 458 may correspond to one or more messages stored at queue, buffer, or cache of the UE 115. In the example of FIG. 4, the messages 458 include a first message 460 associated with the granted network slice 414.

FIG. 4 also illustrates that the messages 458 may include a second message 462 associated with the requested network slice 404. The second message 462 may have a second field corresponding to (e.g., matching) the first field of the data session establishment request 402. For example, if the first field indicates the requested network slice 404, then the second field matches the first field if the second field also indicates the requested network slice 404. As another example, if the first field fails to indicate a requested network slice 404 (e.g., where the first field is "empty"), then the second field matches the first field if the second field also fails to indicate a requested network slice 404 (e.g., where the second field is "empty").

The messages 458 may include or correspond to messages (e.g., requests) that are to be avoided during operation of the back-off timer 454. For example, the messages 458 may include a 5GSM request associated with a network slice of the data session 418, and a 5GSM communication protocol may specify that the UE 115 is to avoid sending a request associated with the network slice of the data session 418 during operation of the back-off timer 454. In some aspects of the disclosure, both the requested network slice 404 and the granted network slice 414 may be considered the network slice of the data session 418.

In some examples, the UE 115 is configured to present a message during a delay period associated with the messages 458. For example, a user may initiate an operation associated with the messages 458, such as by loading an application that is to use the requested network slice 404 or the granted network slice 414. In this case, in response to determining that the user-initiated operation is subject to operation of the back-off timer 454, the UE 115 may present a notification alerting the user that the user-initiated operation is subject to operation of the back-off timer 454. In some cases, the notification may indicate a time until the operation can be completed (e.g., by indicating the value 456 of the back-off timer 454). As a result, the user may be alerted sooner as compared to certain conventional techniques that attempt to perform the operation (e.g., by sending the messages 458) and then wait until the operation fails or "times out" (e.g., due to failure to receive a response to the messages 458).

In response to expiration of the back-off timer 454, the UE 115 may send, to the base station 105, the messages 458. For example, upon detecting the value 456 reaching the back-off timer value 424 (or another number), the UE 115 may send the messages 458 to the base station 105 (e.g., by emptying a queue, buffer, or cache storing the messages 458). The UE 115 may be configured to terminate operation of the back-off timer 454 in response to detecting expiration of the back-off timer 454.

In one example, the UE 115 includes a control circuit coupled to the back-off timer 454 and to a memory (e.g., a queue, buffer, or cache) that is configured to store the messages 458. The control circuit may be configured provide a control signal to the memory. During operation of the back-off timer 454, the control signal may have a first value (e.g., a logic "0" value or a logic "1" value). The memory may be configured to refrain from outputting the messages 458 based on the first value of the control signal. Upon expiration of the back-off timer 454, the control circuit may transition the control signal from the first value to a second value (e.g., a logic "1" value or a logic "0" value). The memory may be configured to output the messages 458 in response to the second value of the control signal.

Although certain examples have been described with reference to storing the messages 458 at a memory (e.g., a queue, buffer, or cache), other implementations are also within the scope of the disclosure. In some examples, one or more of the messages 458 can be generated after a check of the back-off timer 454 (e.g., by generating one or more of the messages 458 "just in time"). For example, prior to generating one or more of the messages 458, an application or application layer associated with the data session 418 may issue a request for data transfer using the data session 418. In response to the request, the UE 115 may perform a check of the back-off timer 454 (e.g., to determine whether the request is subject to the back-off timer 454). In response to the check indicating that the back-off timer 454 is running, the UE 115 may provide an indication to the application (or application layer) that the request is rejected. The indication may include the value 456 of the back-off timer 454. In this case, the application or application layer may repeat the request at a later time (e.g., upon expiration of the back-off timer 454). Alternatively, if the check indicates that the back-off timer 454 is not running, the application or application layer may generate (e.g., assemble) one or more of the messages 458 based on the request, and the UE 115 may transmit the and transmit the one or more messages 458 to the base station 105.

In some examples, the UE 115 is configured to access the indication 452 stored at the memory 282 to determine that operation of the back-off timer 454 applies to the requested network slice 404. For example, the UE 115 may be configured to check a network slice indicated by a message of the messages 458 to determine whether sending of the message should be delayed until expiration of the back-off timer 454.

In some examples, the back-off timer value 424 may be selected from a range of values, which may include a zero value. In some examples, the UE 115 is configured to detecting that the back-off timer value 424 is greater than zero and to initiate operation of the back-off timer 454 in response to detecting that the back-off timer value 424 is greater than zero. Alternatively, in some other examples, the UE 115 may be configured to avoid initiating operation of the back-off timer 454 in response to detecting that the back-off timer value 424 corresponds to zero.

In some examples, one or both of data session release command 422 or the data session modification rejection message includes a cause value 430 indicating either a first type of the back-off timer value 424 or a second type of the back-off timer value. The first type may indicate that the back-off timer value 424 is associated with network slices.

In this example, the UE 115 may delay sending messages associated with requested network slice 404 and may further delay sending messages associated with the granted network slice 414 during operation of the back-off timer 454. The second type may indicate that the back-off timer value 424 is associated with network slices and DNNs. In this example, the UE 115 may delay sending messages associated with network slices and may further delay sending messages associated with a DNN of the data session 418 during operation of the back-off timer 454. To further illustrate, in response to indication of the first type, the back-off timer 454 may correspond to a timer T3485 specified by a 3rd Generation Partnership Project (3GPP) communication protocol, and in response to indication of the second type, the back-off timer 454 may correspond to a timer T3484 specified by a 3GPP communication protocol.

Figure 5:
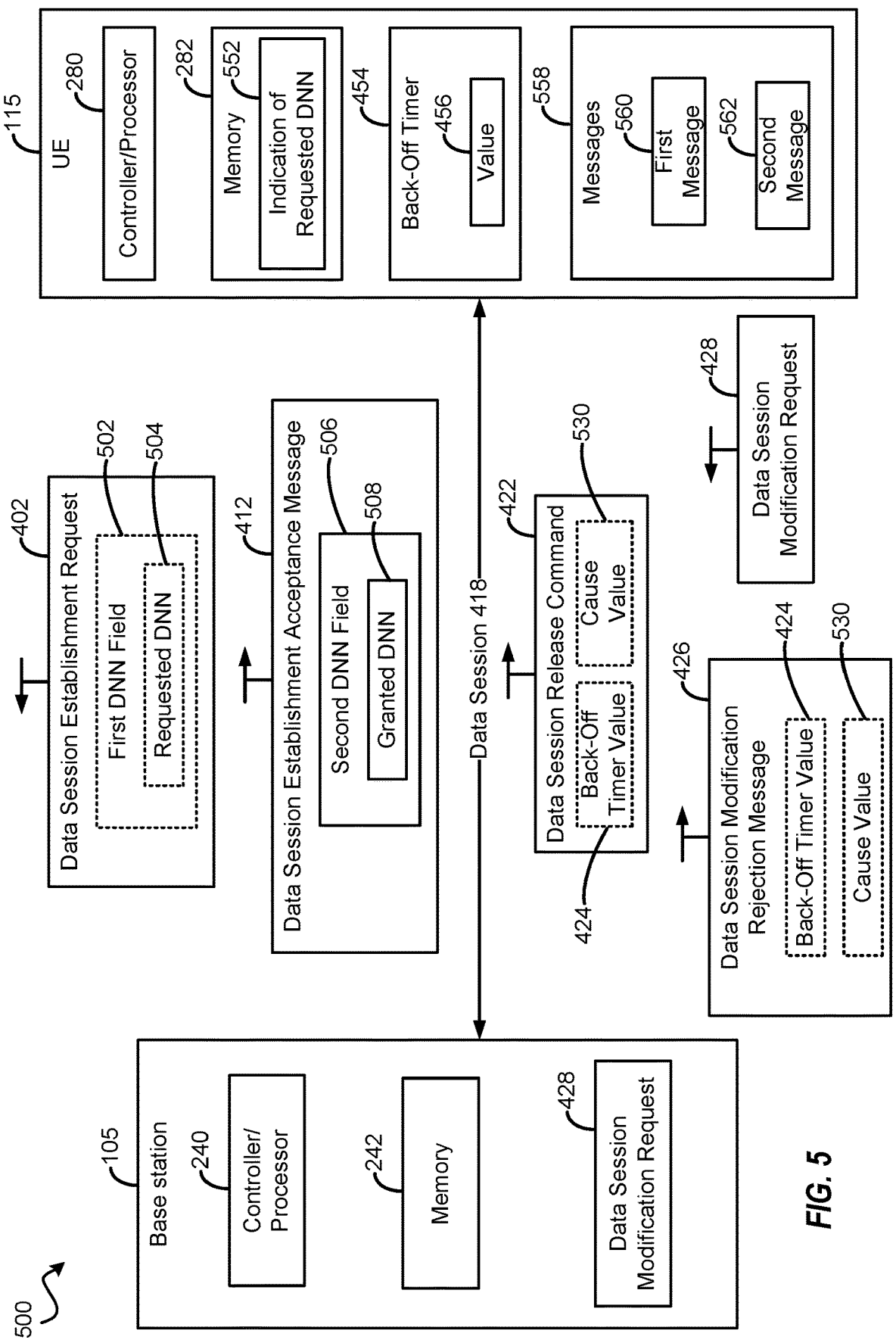
FIG. 5 is a block diagram illustrating an example of a wireless communication system configured to perform wireless communications related to domain network names (DNNs) based on a back-off timer according to some aspects of the present disclosure.

Referring to FIG. 5, another example of a wireless communication system is depicted and generally designated 500. In FIG. 5, certain operations of the wireless communication system 500 may generally be as described with reference to the wireless communication system 400 of FIG. 4. In FIG. 5, the data session establishment request 402 indicates a requested DNN 504 for the data session 418. In an alternate example, the data session establishment request 402 does not indicate any DNN.

Further, in FIG. 5, the data session establishment acceptance message 412 indicates a granted DNN 508 for the data session 418. The granted DNN 508 may be different than the requested DNN 504. In the example of FIG. 5, the data session establishment request 402 includes a first DNN field 502 indicating the requested DNN 504, and the data session establishment acceptance message 412 includes a second DNN field 506 indicating the granted DNN 508.

In the example of FIG. 5, operation of the back-off timer 454 may be associated with the requested DNN 504 and the granted DNN 508. The UE 115 may be configured to delay, until expiration of the back-off timer 454, sending messages 558 associated with the requested DNN 504, the granted DNN 508, or both (e.g., during a time interval that begins upon initiating the operation of the back-off timer 454 and that ends upon the expiration of the back-off timer 454). For example, the messages 558 may include a first message 560 that is associated with the requested DNN 504.

FIG. 5 also illustrates that the messages 558 may include a second message 562 associated with the requested DNN 504. The second message 562 may have a second field corresponding to (e.g., matching) a first field (e.g., the first DNN field 502) of the data session establishment request 402. For example, if the first field indicates the requested DNN 504, then the second field matches the first field if the second field also indicates the requested DNN 504. As another example, if the first field fails to indicate a requested DNN 504 (e.g., where the first field is "empty"), then the second field matches the first field if the second field also fails to indicate a requested DNN 504 (e.g., where the second field is "empty").

The messages 558 may include or correspond to messages (e.g., requests) that are to be avoided during operation of the back-off timer 454. For example, the messages 558 may include a 5GSM request associated with a DNN of the data session 418, and a 5GSM communication protocol may specify that the UE 115 is to avoid sending a request associated with the DNN of the data session 418 during operation of the back-off timer 454. In some aspects of the disclosure, both the requested DNN 504 and the granted DNN 508 may be considered the DNN of the data session 418.

In some examples, the UE 115 is configured to present a message during a delay period associated with the messages 558. For example, a user may initiate an operation associated with the messages 558, such as by loading an application that is to use the requested DNN 504 or the granted DNN 508. In this case, in response to determining that the user-initiated operation is subject to operation of the back-off timer 454, the UE 115 may present a notification alerting the user that the user-initiated operation is subject to operation of the back-off timer 454. In some cases, the notification may indicate a time until the operation can be completed (e.g., by indicating the value 456 of the back-off timer 454). As a result, the user may be alerted sooner as compared to certain conventional techniques that attempt to perform the operation (e.g., by sending the messages 558) and then wait until the operation fails or "times out" (e.g., due to failure to receive a response to the messages 558).

Although certain examples have been described with reference to storing the messages 558 at a memory (e.g., a queue, buffer, or cache), other implementations are also within the scope of the disclosure. In some examples, one or more of the messages 558 can be generated after a check of the back-off timer 454 (e.g., by generating one or more of the messages 558 "just in time"). For example, prior to generating one or more of the messages 558, an application or application layer associated with the data session 418 may issue a request for data transfer using the data session 418. In response to the request, the UE 115 may perform a check of the back-off timer 454 (e.g., to determine whether the request is subject to the back-off timer 454). In response to the check indicating that the back-off timer 454 is running, the UE 115 may provide an indication to the application (or application layer) that the request is rejected. The indication may include the value 456 of the back-off timer 454. In this case, the application or application layer may repeat the request at a later time (e.g., upon expiration of the back-off timer 454). Alternatively, if the check indicates that the back-off timer 454 is not running, the application or application layer may generate (e.g., assemble) one or more of the messages 558 based on the request, and the UE 115 may transmit the and transmit the one or more messages 558 to the base station 105.

In some examples, the UE 115 is configured to store, at the memory 282, an indication 552 of the requested DNN 504. The UE 115 may be configured to access the indication 552 to determine that operation of the back-off timer 454 applies to the requested DNN 504.

In some examples, one or both of the data session release command 422 or the data session modification rejection message includes a cause value 530 indicating either a first type of the back-off timer value 424 or a second type of the back-off timer value. The first type may indicate that the back-off timer value 424 is associated with DNNs. In this example, the UE 115 may delay sending messages associated with the requested DNN 504 and may further delay sending messages associated with the granted DNN 508 during operation of the back-off timer 454. The second type may indicate that the back-off timer value 424 is associated with network slices and DNNs. In this example, the UE 115 may delay sending messages associated with one or more network slices of the data session 418 (e.g., the requested network slice 404 and the granted network slice 414) and may further delay sending messages associated with the requested DNN 504 and the granted DNN 508 during operation of the back-off timer 454. To further illustrate, in response to indication of the first type, the back-off timer 454 may correspond to a timer T3396 specified by a 3GPP communication protocol, and in response to indication of the second type, the back-off timer 454 may correspond to a timer T3484 specified by a 3GPP communication protocol.

Figure 6:
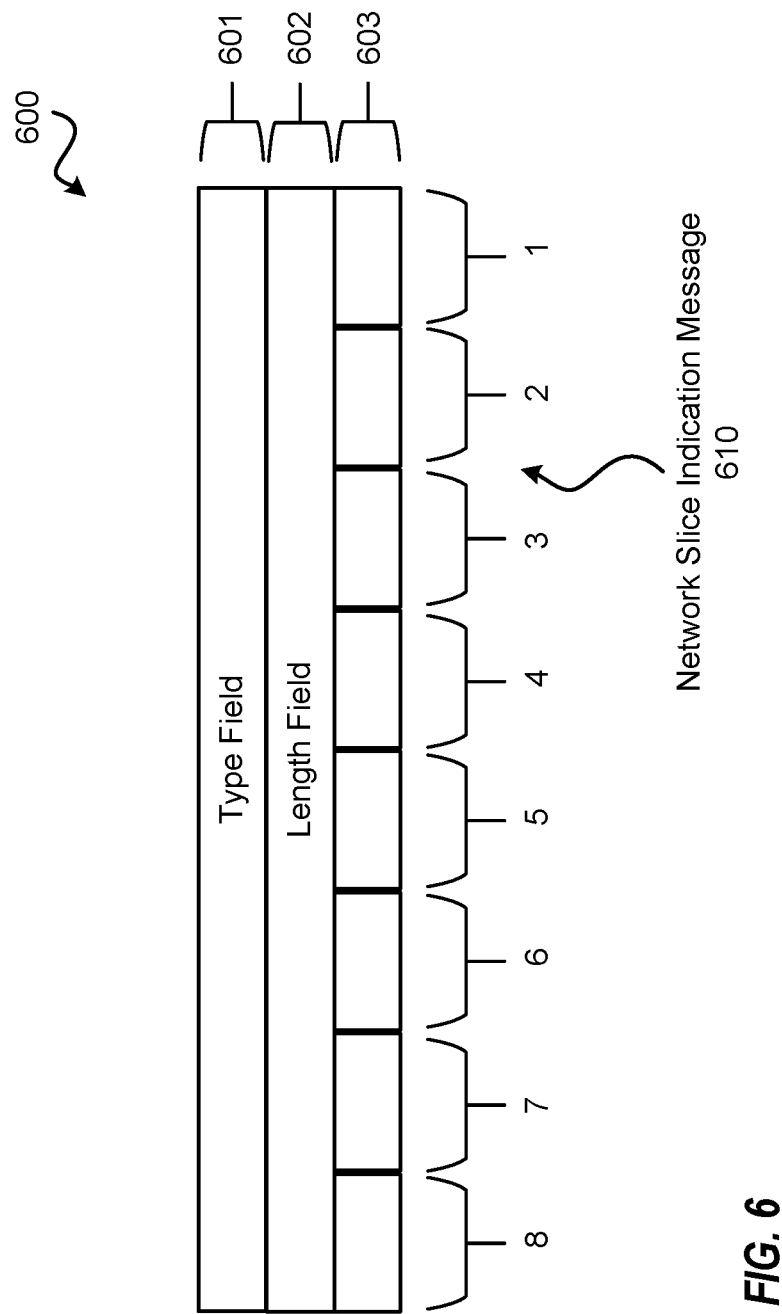
FIG. 6 is a block diagram illustrating an example of a congestion notification message indicating a network slice indication message according to some aspects of the present disclosure.

FIG. 6 illustrates an illustrative example of a congestion notification message 600. In one example, the congestion notification message 600 corresponds to a fifth-generation session management (5GSM) congestion re-attempt information element (IE). The base station 105 may be configured to send the congestion notification message 600 to the UE 115. For example, in some implementations, the base station 105 is configured to include the congestion notification message 600 in the data session release command 422, in the data session modification rejection message 426, or both.

The congestion notification message 600 may include a type field 601, a length field 602, and a plurality of bits 603. In one example, the type field 601 indicates that the congestion notification message 600 is a 5GSM congestion re-attempt IE. In one example, the length field indicates a length of the congestion notification message 600. In some examples, the type field 601, the length field 602, and the plurality of bits 603 each include a respective bit octet of eight bits (e.g., bits 1, 2, 3, 4, 5, 6, 7, and 8 as illustrated in the example of FIG. 6).

In some examples, a first bit (e.g., bit 1) of the plurality of bits 603 is associated with the back-off timer 454. For example, the first bit of the plurality of bits 603 may have either a first value (e.g., a logic "0" value) or a second value (e.g., a logic "1" value). The first value may indicate that the back-off timer value 424 is applicable to a public land mobile network (PLMN) registered to the UE 115 (e.g., a registered PLMN). The second value may indicate that the back-off timer value is applicable to multiple PLMNs.

In accordance with some aspects of the disclosure, one or more of the plurality of bits 603 are used to indicate a network slice indication message 610. The network slice indication message 610 may indicate one or more network slices associated with (or not associated with) operation of the back-off timer 454, such as one or both of the requested network slice 404 or the granted network slice 414.

To illustrate, in a first example, a second bit (e.g., bit 2) of the plurality of bits 603 has either a first value or a second value. The first value may indicate that the back-off timer value 424 is applicable to the requested network slice 404, and the second value may indicate that the back-off timer value is applicable to the granted network slice 414. Table 1 illustrates certain illustrative aspects of the first example:

TABLE 1

| Value of Second Bit | Back-off Timer Applied to Requested Network Slice? | Back-off Timer Applied to Granted Network Slice? |
| --- | --- | --- |
| 0 | Yes | |
| 1 | | Yes |

In a second example, the second bit has either a first value indicating that the back-off timer value 424 is inapplicable to the requested network slice 404 or a second value indicating that the back-off timer value is applicable to the requested network slice 404. In the second example, a third bit (e.g., the bit 3) of the plurality of bits 603 has either a first value indicating that the back-off timer value 424 is inapplicable to the granted network slice 414 or a second value indicating that the back-off timer value 424 is applicable to the granted network slice 414. To further illustrate, Table 2 illustrates certain illustrative aspects of the second example:

TABLE 2

| Value of Second Bit | Value of Third Bit | Back-off Timer Applied to Requested Network Slice? | Back-off Timer Applied to Granted Network Slice? |
| --- | --- | --- | --- |
| 0 | | No | |
| 1 | | Yes | |
| | 0 | | No |
| | 1 | | Yes |

In a third example, the plurality of bits 603 has either a first set of values indicating that the back-off timer value 424 is applicable to the requested network slice 404, a second set of values indicating that the back-off timer value 424 is applicable to the granted network slice 414, or a third set of values indicating that back-off timer value 424 is applicable to both the requested network slice 404 and the granted network slice 414. To further illustrate, Table 3A illustrates certain illustrative aspects of the third example:

TABLE 3A

| Set of values (e.g., second bit and third bit) | Back-off Timer Applied to Requested Network Slice? | Back-off Timer Applied to Granted Network Slice? |
| --- | --- | --- |
| First set of values: 00 or 10 | Yes | No |
| Second set of values: 01 | No | Yes |
| Third set of values: 11 | Yes | Yes |

In an alternate implementation of the third example, the plurality of bits 603 has a set of values selected from Table 3B:

TABLE 3B

| Set of values (e.g., second bit and third bit) | Back-off Timer Applied to Requested Network Slice? | Back-off Timer Applied to Granted Network Slice? |
| --- | --- | --- |
| First set of values: 00 | No information | No information |
| Second set of values: 10 | Yes | No |
| Third set of values: 01 | No | Yes |
| Fourth set of values: 11 | Yes | Yes |

In the example of Table 3B, the first set of values may indicate an implementation-specific association of the back-off timer 454. For example, "no information" may indicate that a UE 115 is allowed to associate operation of the back-off timer 454 with a certain network slice selected (e.g., "preferred") by the UE 115.

In some examples, an implementation in accordance with Table 3B is used in connection with a wireless communication protocol that has multiple versions. A first version (e.g., a less recent version) of the wireless communication protocol may specify that the second bit and the third bit are to be set to zero, and a second version (e.g., a more recent version) may indicate that the second bit and the third bit can each be set to zero or one. As a result, in some examples, an implementation in accordance with Table 3B may be compatible with devices that operate based on the first version and that expect to receive zero values of the second bit and the third bit (and may not "understand" one values of the second bit and the third bit).

Figure 7:
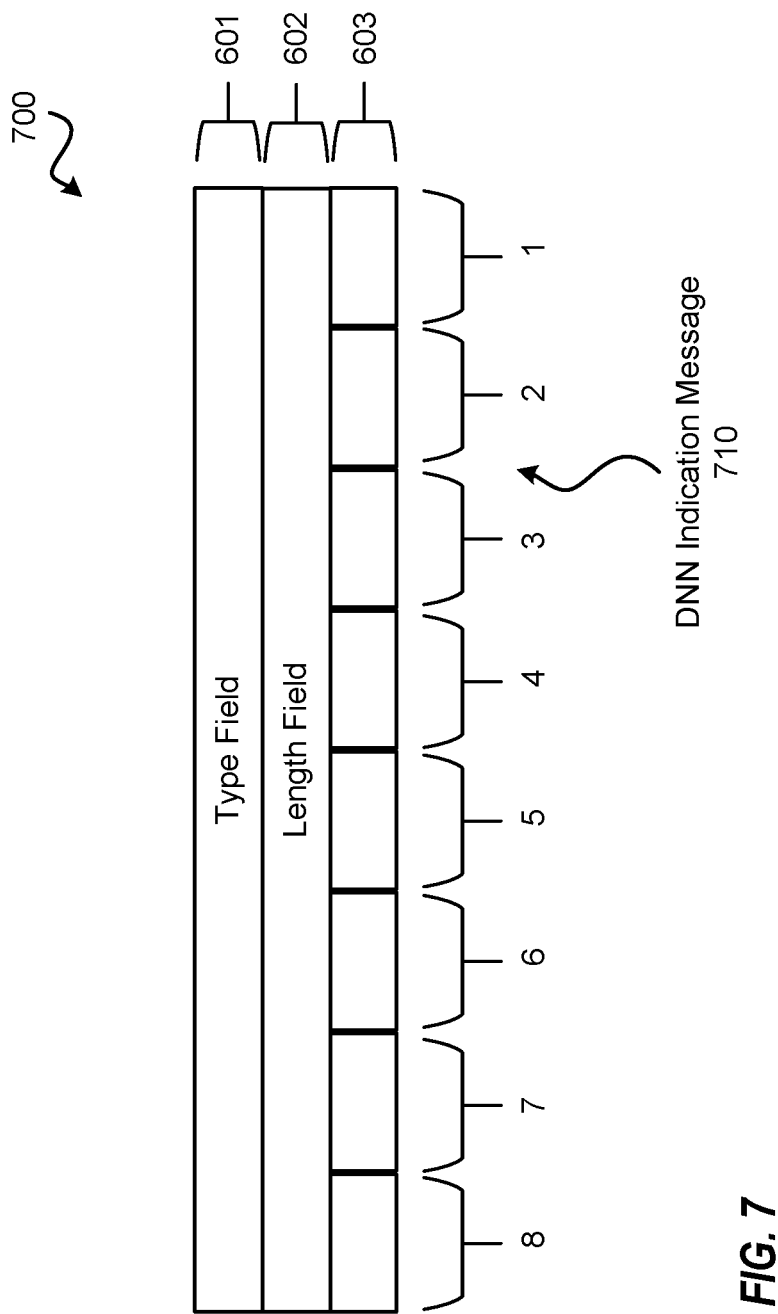
FIG. 7 is a block diagram illustrating an example of a congestion notification message indicating a DNN indication message according to some aspects of the present disclosure.

FIG. 7 depicts another illustrative example of a congestion notification message 700. In one example, the congestion notification message 700 corresponds to 5GSM congestion re-attempt IE. The base station 105 may be configured to send the congestion notification message 600 to the UE 115. For example, in some implementations, the base station 105 is configured to include the congestion notification message 600 in the data session release command 422, in the data session modification rejection message 426, or both. One or more aspects of the congestion notification message 700 of FIG. 7 may correspond to the congestion notification message 600 of FIG. 6.

In the example of FIG. 7, one or more of the plurality of bits 603 indicate a DNN indication message 710. In accordance with some aspects of the disclosure, the DNN indication message 710 indicates one or more DNNs associated with (or not associated with) operation of the back-off timer 454, such as one or both of the requested DNN 504 or the granted DNN 508.

To illustrate, in a first example, a second bit (e.g., bit 2) of the plurality of bits 603 has either a first value or a second value. The first value may indicate that the back-off timer value 424 is applicable to the requested DNN 504, and the second value may indicate that the back-off timer value is applicable to the granted DNN 508. Table 4 illustrates certain illustrative aspects of the first example:

TABLE 4

| Value of Second Bit | Back-off Timer Applied to Requested DNN? | Back-off Timer Applied to Granted DNN? |
|---|---|---|
| 0 | Yes | |
| 1 | | Yes |

In a second example, the second bit has either a first value indicating that the back-off timer value 424 is inapplicable to the requested DNN 504 or a second value indicating that the back-off timer value is applicable to the requested DNN 504. In the second example, a third bit (e.g., the bit 3) of the plurality of bits 603 has either a first value indicating that the back-off timer value 424 is inapplicable to the granted DNN 508 or a second value indicating that the back-off timer value 424 is applicable to the granted DNN 508. To further illustrate, Table 5 illustrates certain illustrative aspects of the second example:

TABLE 5

| Value of Second Bit | Value of Third Bit | Back-off Timer Applied to Requested DNN? | Back-off Timer Applied to Granted DNN? |
|---|---|---|---|
| 0 | | No | |
| 1 | | Yes | |
| | 0 | | No |
| | 1 | | Yes |

In a third example, the plurality of bits 603 has either a first set of values indicating that the back-off timer value 424 is applicable to the requested DNN 504, a second set of values indicating that the back-off timer value 424 is applicable to the granted DNN 508, or a third set of values indicating that back-off timer value 424 is applicable to both the requested DNN 504 and the granted DNN 508. To further illustrate, Table 6 illustrates certain illustrative aspects of the third example:

TABLE 6

| Set of values (e.g., second bit and third bit) | Back-off Timer Applied to Requested DNN? | Back-off Timer Applied to Granted DNN? |
|---|---|---|
| First set of values: 00 or 10 | Yes | |
| Second set of values: 01 | | Yes |
| Third set of values: 11 | Yes | Yes |

In some implementations, a network entity (e.g., a base station 105 or other device) may dynamically select one or more techniques described herein based on one or more criteria. In some deployments, a first technique (e.g., an "implicit" technique) in accordance with FIG. 4 of FIG. 5 may be advantageous in connection with a first wireless communication protocol that does not permit changes in network slices (or DNNs) during data sessions. In this case, the network entity may select operation based on the first technique in response to detecting that a threshold number of UEs 115 that communicate using the first wireless communication protocol. In some other deployments, a second technique (e.g., an "explicit" technique) in accordance with FIG. 6 of FIG. 7 may be more advantageous in connection with a second wireless communication protocol that permits changes in network slices (or DNNs) during data sessions. In this case, the network entity may select the second technique in response to detecting that a threshold number of UEs that communicate using the second wireless communication protocol.

Alternatively or in addition, in some implementations, the network entity may select the first technique or the second technique based at least in part on a number of default session management functions (SMFs) of the network that process requests not specifying a network slice (or DNN). For example, with a greater number of SMFs in the network, blocking requests that do not specify a network slice (or DNN) may be unnecessary, which may make operation according to the second technique more advantageous as compared to operation according to the first technique in some cases. As a result, the network entity may be configured to select operation according to the first technique in response to detecting that a number of default SMFs in the network fails to satisfy (e.g., is less than) a threshold and to select operation according to the second technique in response to detecting that the number of default SMFs in the network satisfies (e.g., is greater than or equal to) the threshold.

By determining or indicating one or more network slices or DNNs in accordance with one or more aspects of FIGS. 4-7, network resource allocation may be improved. For example, one or more aspects of FIG. 4-7 may reduce or avoid situations in which a UE 115 avoids sending a message despite being eligible to send the message. As another example, one or more aspects of FIGS. 4-7 may reduce or avoid situations in which a device sends a message associated with a certain network slice or DNN despite being ineligible to do so (e.g., prior to expiration of the back-off timer 454).

Further, in some cases, user experience may be improved by determining or indicating one or more network slices or DNNs in accordance with some aspects of FIGS. 4-7. To illustrate, a user may initiate an operation subject to the back-off timer 454. In this case, in response to determining that the user-initiated operation is subject to operation of the back-off timer 454, the UE 115 may present a notification alerting the user that the operation is subject to operation of the back-off timer 454. In some cases, the notification may indicate a time until the operation can be completed (e.g., by indicating the value 456 of the back-off timer 454). As a result, the user may be alerted sooner as compared to certain conventional techniques that attempt to perform the operation and then wait until the operation fails or "times out" (e.g., due to failure to receive a response to a message indicating a network slice that is subject to the back-off timer 454).

Referring to FIG. 8, an illustrative example of a method of operation of a UE is depicted and generally designated 800. In some examples, the method 800 is performed by the UE 115 in accordance with one or more aspects described with reference to FIG. 4.

The method 800 includes sending, by a UE device to a network device, a data session establishment request to establish a data session with the network device using a wireless communication network, at 802. The data session establishment request has a first field usable to indicate a requested network slice for the data session. For example, the UE 115 may send the data session establishment request 402 to the base station 105 to establish the data session 418. The data session establishment request 402 has a first field usable to indicate the requested network slice 404.

The method 800 further includes receiving, at the UE device and from the network device, an indication of a granted network slice for the data session, at 804. For example, the UE 115 may receive the data session establishment acceptance message 412 from the base station 105. In other examples, the UE 115 may receive another message that changes the network slice of the data session 418.

The method 800 further includes receiving, at the UE device, an indication of a back-off timer value from the network device, at 806. The UE 115 may receive an indication of the back-off timer value 424 via the data session release command 422 or via the data session modification rejection message 426, as illustrative examples.

The method 800 further includes, during operation of a back-off timer based on the back-off timer value, avoiding sending a first message associated with the granted network slice and avoiding sending a second message having a second field corresponding to the first field of the data session establishment request, at 808. For example, the UE 115 may initialize the value 456 of the back-off timer 454 based on the back-off timer value 424 (e.g., by beginning to count down from, or up to, the back-off timer value 424 using the back-off timer 454). During operation of the back-off timer 454, the UE 115 may avoid sending the first message 460 (e.g., in response to detecting that the first message 460 indicates the granted network slice 414) and may avoid sending the second message 462 (e.g., in response to detecting that the second field of the second message 462 matches the first field of the data session establishment request 402).

The method 800 may further include, in response to expiration of the back-off timer, sending, by the UE device to the network device, the first message and the second message, at 810. For example, the UE 115 may send the first message 460 and the second message 462 to the base station 105 upon expiration of the back-off timer 454.

Referring to FIG. 9, an illustrative example of a method of operation of a UE is depicted and generally designated 800. In some examples, the method 900 is performed by the UE 115 in accordance with one or more aspects described with reference to FIG. 5.

The method 900 includes sending, by a UE device to a network device, a data session establishment request to establish a data session with the network device using a wireless communication network, at 902. The data session establishment request has a first field usable to indicate a requested DNN for the data session. For example, the UE 115 may send the data session establishment request 402 to the base station 105 to establish the data session 418. The data session establishment request 402 has a first field (e.g., the first DNN field 502) usable to indicate the requested DNN 504.

The method 900 further includes receiving, at the UE device and from the network device, an indication of a granted DNN for the data session, at 904. For example, the UE 115 may receive the data session establishment acceptance message 412 from the base station 105. In other examples, the UE 115 may receive another message that changes the DNN of the data session 418.

The method 900 further includes receiving, at the UE device, an indication of a back-off timer value from the network device, at 906. The UE 115 may receive an indication of the back-off timer value 424 via the data session release command 422 or via the data session modification rejection message 426, as illustrative examples.

The method 900 further includes, during operation of a back-off timer based on the back-off timer value, avoiding sending a first message associated with the granted DNN and avoiding sending a second message having a second field corresponding to the first field of the data session establishment request, at 908. For example, the UE 115 may initialize the value 456 of the back-off timer 454 based on the back-off timer value 424 (e.g., by beginning to count down from, or up to, the back-off timer value 424 using the back-off timer 454). During operation of the back-off timer 454, the UE 115 may avoid sending the first message 560 (e.g., in response to detecting that the first message 560 indicates the granted DNN 508) and may avoid sending the second message 562 (e.g., in response to detecting that the second field of the second message 562 matches the first field of the data session establishment request 402).

The method 900 may further include, in response to expiration of the back-off timer, sending, by the UE device to the network device, the first message and the second message, at 910. For example, the UE 115 may send the first message 560 or the second message 562 to the base station 105 upon expiration of the back-off timer 454.

Referring to FIG. 10, an illustrative example of a method of operation of a UE is depicted and generally designated 1000. In some examples, the method 1000 is performed by the UE 115 in accordance with one or more aspects described with reference to FIG. 6, such as any of the examples described with reference to Tables 1, 2, 3A, or 3B.

The method 1000 includes sending, by a UE device to a network device, a data session establishment request to establish a data session with the network device using a wireless communication network, at 1002. For example, the UE 115 may send the data session establishment request 402 to the base station 105 to establish the data session 418.

The method 1000 further includes receiving, at the UE device and from the network device, an indication of a granted network slice for the data session, at 1004. For example, the UE 115 may receive the data session establishment acceptance message 412 from the base station 105. In other examples, the UE 115 may receive another message that changes the network slice of the data session 418.

The method 1000 further includes receiving, at the UE device from the network device, a congestion notification message indicating one or more network slices associated with a back-off timer value, at 1006. The one or more network slices indicate one or both of the granted network slice or a requested network slice specified by the UE device. The congestion notification message may correspond to the congestion notification message 600 of FIG. 6 and may indicate the requested network slice 404, the granted network slice 414, or both. The UE 115 may receive an indication of the back-off timer value 424 via the data session release command 422 or via the data session modification rejection message 426, as illustrative examples.

The method 1000 further includes initiating operation of a back-off timer of the UE device based on the back-off timer value, at 1008. For example, the UE 115 may initialize the value 456 of the back-off timer 454 based on the back-off timer value 424 (e.g., by beginning to count down from, or up to, the back-off timer value 424 using the back-off timer 454).

The method 1000 further includes, in response to expiration of the back-off timer, sending, by the UE device to the network device, a message associated with at least one of the one or more network slices, at 1010. For example, the UE 115 may send the first message 460 or the second message 462 to the base station 105 upon expiration of the back-off timer 454.

Referring to FIG. 11, an illustrative example of a method of operation of a UE is depicted and generally designated 1100. In some examples, the method 1100 is performed by the UE 115 in accordance with one or more aspects described with reference to FIG. 7, such as any of the examples described with reference to Tables 4, 5, or 6.

The method 1100 includes sending, by a UE device to a network device, a data session establishment request to establish a data session with the network device using a wireless communication network, at 1102. For example, the UE 115 may send the data session establishment request 402 to the base station 105 to establish the data session 418.

The method 1100 further includes receiving, at the UE device and from the network device, an indication of a granted DNN for the data session, at 1104. For example, the UE 115 may receive the data session establishment acceptance message 412 from the base station 105. In other examples, the UE 115 may receive another message that changes the DNN of the data session 418.

The method 1100 further includes receiving, at the UE device from the network device, a congestion notification message indicating one or more DNNs associated with a back-off timer value, at 1106. The one or more DNNs indicate one or both of the granted DNN or a requested DNN specified by the UE device. The congestion notification message may correspond to the congestion notification message 700 of FIG. 7 and may indicate the requested DNN 504, the granted DNN 508, or both. The UE 115 may receive an indication of the back-off timer value 424 via the data session release command 422 or via the data session modification rejection message 426, as illustrative examples.

The method 1100 further includes initiating operation of a back-off timer of the UE device based on the back-off timer value, at 1108. For example, the UE 115 may initialize the value 456 of the back-off timer 454 based on the back-off timer value 424 (e.g., by beginning to count down from, or up to, the back-off timer value 424 using the back-off timer 454).

The method 1100 further includes, in response to expiration of the back-off timer, sending, by the UE device to the network device, a message associated with at least one of the one or more DNNs, at 1110. For example, the UE 115 may send the first message 560 or the second message 562 to the base station 105 upon expiration of the back-off timer 454.

Referring to FIG. 12, an illustrative example of a method of operation of a network device is depicted and generally designated 1200. In some examples, the method 1200 is performed by the base station 105 in accordance with one or more aspects described with reference to FIG. 6, such as any of the examples described with reference to Tables 1, 2, 3A, or 3B.

The method 1200 includes receiving, from a UE device by a network device, a data session establishment request to establish a data session with the network device using a wireless communication network, at 1202. For example, the base station 105 may receive the data session establishment request 402 from the UE 115.

The method 1200 further includes sending, to the UE device and from the network device, an indication of a granted network slice for the data session, at 1204. For example, the base station 105 may send the data session establishment acceptance message 412 to the UE 115. In other examples, the UE 115 may receive another message that changes the network slice of the data session 418.

The method 1200 further includes sending, to the UE device from the network device, a congestion notification message indicating one or more network slices associated with a back-off timer value, at 1206. The one or more network slices indicate one or both of the granted network slice or a requested network slice specified by the UE device. The congestion notification message may correspond to the congestion notification message 600 of FIG. 6 and may indicate of the requested network slice 404, the granted network slice 414, or both.

The method 1200 further includes, in response to expiration of a back-off timer based on the back-off timer value, receiving, from the UE device at the network device, a message associated with at least one of the one or more network slices, at 1208. For example, the base station 105 may receive the first message 460 or the second message 462 from the UE 115 upon expiration of the back-off timer 454. The back-off timer 454 expires based on the back-off timer value 424.

Referring to FIG. 13, an illustrative example of a method of operation of a network device is depicted and generally designated 1300. In some examples, the method 1300 is performed by the base station 105 in accordance with one or more aspects described with reference to FIG. 7, such as any of the examples described with reference to Tables 4, 5, or 6.

The method 1300 includes receiving, from a UE device by a network device, a data session establishment request to establish a data session with the network device using a wireless communication network, at 1302. For example, the base station 105 may receive the data session establishment request 402 from the UE 115.

The method 1300 further includes sending, to the UE device and from the network device, an indication of a granted DNN for the data session, at 1304. For example, the base station 105 may send the data session establishment acceptance message 412 to the UE 115. In other examples, the UE 115 may receive another message that changes the DNN of the data session 418.

The method 1300 further includes sending, to the UE device from the network device, a congestion notification message indicating one or more DNNs associated with a back-off timer value, at 1306. The one or more DNNs indicate one or both of the granted DNN or a requested DNN specified by the UE device. The congestion notification message may correspond to the congestion notification message 700 of FIG. 7 and may indicate of the requested DNN 504, the granted DNN 508, or both.

The method 1300 further includes, in response to expiration of a back-off timer based on the back-off timer value, receiving, from the UE device at the network device, a message associated with at least one of the one or more DNNs, at 1308. For example, the base station 105 may receive the first message 560 or the second message 562 from the UE 115 upon expiration of the back-off timer 454. The back-off timer 454 expires based on the back-off timer value 424.

Figure 14:
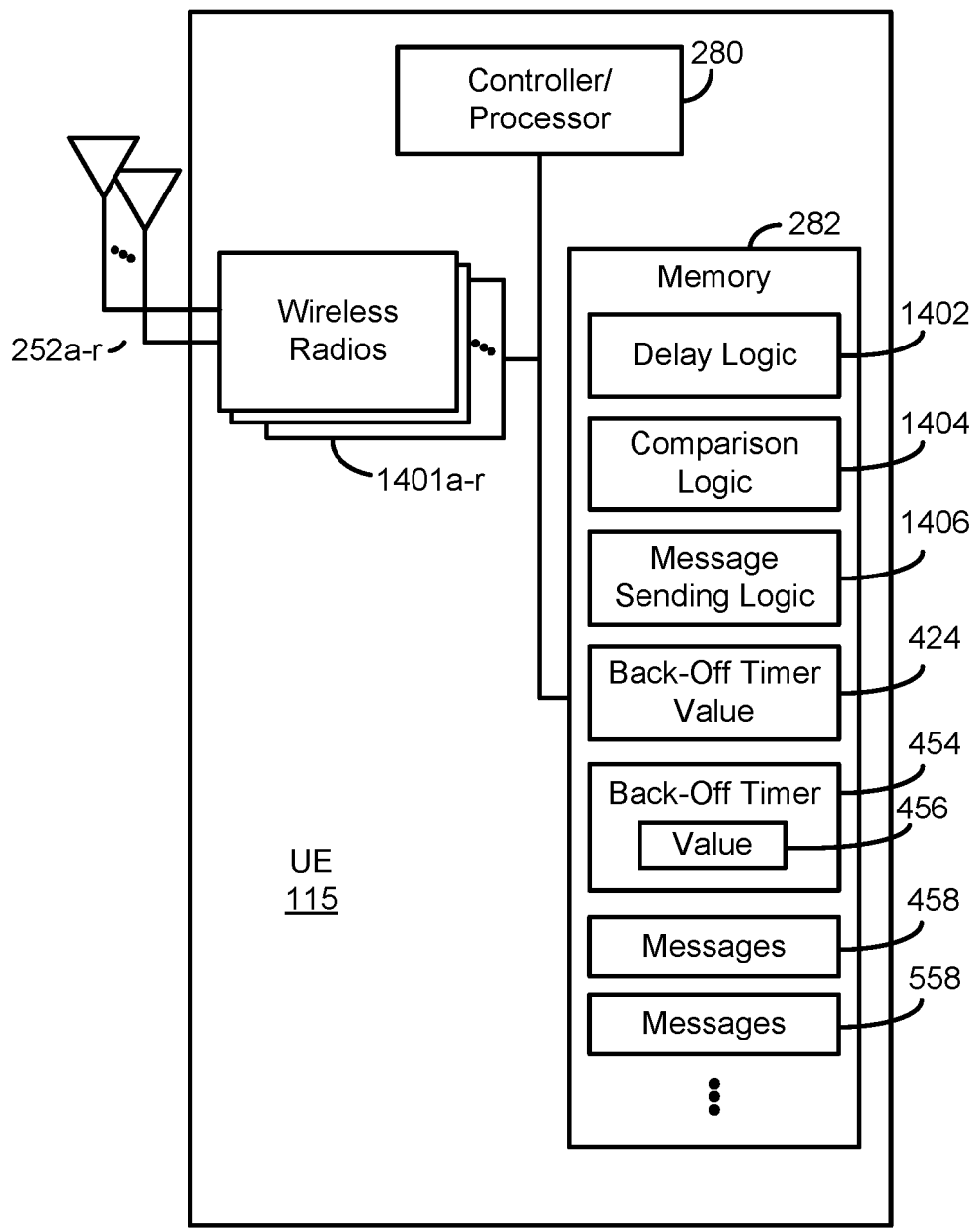
FIG. 14 is a block diagram illustrating an example of a UE configured to perform wireless communication based on a back-off timer according to some aspects of the present disclosure.

FIG. 14 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1401a-r and antennas 252a-r. Wireless radios 1401a-r include various components and hardware, as illustrated in FIG. 2 for UE 115, including modulator/demodulators 254a-r, MIMO detector 256, receive processor 258, transmit processor 264, and TX MIMO processor 266.

Memory 282 is configured to store instructions, data, or other information that enables wireless communication based on the back-off timer 454. For example, memory 282 may store delay logic 1402 executable by the controller/processor 280 to cause the controller/processor 280 to delay sending the messages 458 until expiration of the back-off timer 454. The memory 282 may further store comparison logic 1404 executable by the controller/processor 280 to cause the controller/processor 280 to compare the value 456 to the back-off timer value 424 to detect expiration of the back-off timer 454. The memory 282 may further store message sending logic 1406 executable by the controller/processor 280 to initiate sending of the messages 458 to the base station 105. Alternatively or in addition, the delay logic 1402 may be executable by the controller/processor 280 to cause the controller/processor 280 to delay sending the messages 558 until expiration of the back-off timer 454, and the message sending logic 1406 may be executable by the controller/processor 280 to initiate sending of the messages 558 to the base station 105.

Figure 15:
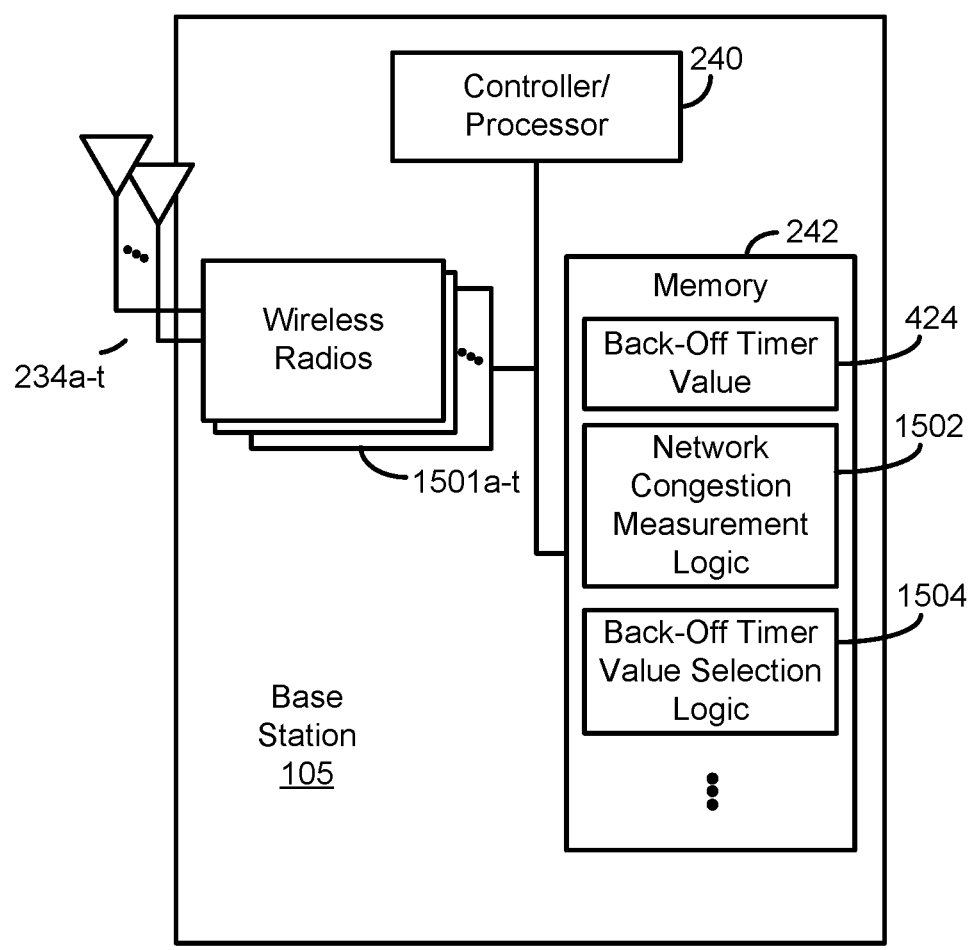
FIG. 15 is a block diagram illustrating an example of a base station configured to perform wireless communication based on a back-off timer according to some aspects of the present disclosure.

FIG. 15 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1401a-t and antennas 234a-t. Wireless radios 1401a-t include various components and hardware, as illustrated in FIG. 2 for base station 105, including modulator/demodulators 232a-t, MIMO detector 236, receive processor 238, transmit processor 220, and TX MIMO processor 230.

Memory 242 is configured to store instructions, data, or other information that enables communications based on the back-off timer value 424. For example, memory 242 may store network congestion logic 1502 that is executable by the controller/processor 240 to determine an amount or type of network congestion associated with a wireless communication system, such as the wireless communication system 400 of FIG. 4 or the wireless communication system 500 of FIG. 5. As another example, memory 242 may store back-off timer value selection logic 1504 executable by the controller/processor 240 to determine (e.g., based on the amount or type of network congestion) the back-off timer value 424. Further, in some examples, the memory 242 may store data or instructions representing one or more aspects of any of Tables 1-6.

To further illustrate certain aspects of the disclosure, Table 7 depicts contents that may be indicated by an example of a uplink (UL) non-access stratum (NAS) transport message. In some examples, the NAS transport message corresponds to or includes the data session establishment request 402. To illustrate, an information element "payload container" of Table 7 may correspond to the data session establishment request 402. In some examples, an information element identifier (IEI) 22 of Table 7 corresponds to the requested network slice 404. Alternatively or in addition, an IEI 25 of Table 7 may correspond to the requested DNN 504.

TABLE 7

| IEI | Information Element | Type/Reference | Presence | Format | Length |
|---|---|---|---|---|---|
|  | Extended protocol discriminator | Extended protocol discriminator | M | V | 1 |
|  | Security header type | Security header type | M | V | ½ |
|  | Spare half octet | Spare half octet | M | V | ½ |
|  | UL NAS TRANSPORT message identity | Message type | M | V | 1 |
|  | Payload container type | Payload container type | M | V | ½ |
|  | Spare half octet | Spare half octet | M | V | ½ |
|  | Payload container | Payload container | M | LV-E | 3-65537 |
| 12 | PDU session ID | PDU session identity 2 | C | TV | 2 |
| 59 | Old PDU session ID | PDU session identity 2 | O | TV | 2 |
| 8 | Request type | Request type | O | TV | 1 |
| 22 | S-NSSAI | S-NSSAI | O | TLV | 3-10 |
| 25 | DNN | DNN | O | TLV | 3-102 |
| 24 | Additional information | Additional information | O | TLV | 3-n |
| A- | MA PDU session information | MA PDU session information | O | TV | 1 |
| F- | Release assistance indication | Release assistance indication | O | TV | 1 |

Table 8 depicts contents that may be indicated by an example of a PDU session establishment accept message. In one example, the PDU session establishment accept message corresponds to the data session establishment acceptance message 412. In one example, an IEI 22 of Table 8 may correspond to the granted network slice 414. Alternatively or in addition, an IEI 25 of Table 8 may correspond to the granted DNN 508.

TABLE 8

| IEI | Information Element | Type/Reference | Presence | Format | Length |
|---|---|---|---|---|---|
|  | Extended protocol discriminator | Extended protocol discriminator | M | V | 1 |
|  | PDU session ID | PDU session identity | M | V | 1 |
|  | PTI | Procedure transaction identity | M | V | 1 |
|  | PDU SESSION ESTABLISHMENT ACCEPT message identity | Message type | M | V | 1 |
|  | Selected PDU session type | PDU session type | M | V | ½ |
|  | Selected SSC mode | SSC mode | M | V | ½ |
|  | Authorized QoS rules | QoS rules | M | LV-E | 6-65538 |
|  | Session AMBR | Session-AMBR | M | LV | 7 |
| 59 | 5GSM cause | 5GSM cause | O | TV | 2 |
| 29 | PDU address | PDU address | O | TLV | 7, 11 or 15 |
| 56 | RQ timer value | GPRS timer | O | TV | 2 |
| 22 | S-NSSAI | S-NSSAI | O | TLV | 3-10 |
| 8- | Always-on PDU session indication | Always-on PDU session indication | O | TV | 1 |
| 75 | Mapped EPS bearer contexts | Mapped EPS bearer contexts | O | TLV-E | 7-65538 |
| 78 | EAP message | EAP message | O | TLV-E | 7-1503 |
| 79 | Authorized QoS flow descriptions | QoS flow descriptions | O | TL V-E | 6-65538 |
| 7B | Extended protocol configuration options | Extended protocol configuration options | O | TLV-E | 4-65538 |
| 25 | DNN | DNN | O | TLV | 3-102 |
| XX | 5GSM network feature support | 5GSM network feature support | O | TLV | 3-15 |
| TBD | Serving PLMN rate control | Serving PLMN rate control | O | TL V | 4 |
| XX | ATSSS container | ATSSS container | O | TLV-E | 3-65538 |
| XX | Control plane only indication | Control plane only indication | O | TV | 1 |
| 66 | Header compression configuration | Header compression configuration | O | TL V | 5-257 |

Table 9 depicts certain contents that may be indicated by an example of a PDU session release command. In one example, the PDU session release command message corresponds to the data session release command 422. In Table 9, an IEI 37 may correspond to the back-off timer value 424, and an IE "5GSM cause" may correspond to the cause value 430.

TABLE 9

| IEI | Information Element | Type/Reference | Presence | Format | Length |
|---|---|---|---|---|---|
|  | Extended protocol discriminator | Extended protocol discriminator | M | V | 1 |
|  | PDU session ID | PDU session identity | M | V | 1 |
|  | PTI | Procedure transaction identity | M | V | 1 |
|  | PDU SESSION RELEASE COMMAND message identity | Message type | M | V | 1 |
|  | 5GSM cause | 5GSM cause | M | V | 1 |
| 37 | Back-off timer value | GPRS timer 3 | O | TLV | 3 |
| 78 | EAP message | EAP message | O | TLV-E | 7-1503 |
| 61 | 5GSM congestion re-attempt indicator | 5GSM congestion re-attempt indicator | O | TLV | 3 |
| 7B | Extended protocol configuration options | Extended protocol configuration options | O | TLV-E | 4-65538 |
|  | Access type | Access type | O | TV | 1 |

Table 10 depicts certain contents that may be indicated by an example of a PDU session modification reject message. In one example, the PDU session modification reject message corresponds to the data session modification rejection message 426. In Table 9, an IEI 37 may correspond to the back-off timer value 424, and an IE "5GSM cause" may correspond to the cause value 430.

TABLE 10

| IEI | Information Element | Type/Reference | Presence | Format | Length |
|---|---|---|---|---|---|
| | Extended protocol discriminator | Extended protocol discriminator | M | V | 1 |
| | PDU session ID | PDU session identity | M | V | 1 |
| | PTI | Procedure transaction identity | M | V | 1 |
| | PDU SESSION MODIFICATION REJECT message identity | Message type | M | V | 1 |
| | 5GSM cause | 5GSM cause | M | V | 1 |
| 37 | Back-off timer value | GPRS timer 3 | O | TLV | 3 |
| 7B | Extended protocol configuration options | Extended protocol configuration options | O | TLV-E | 4-65538 |
| | Re-attempt indicator | Re-attempt indicator | O | TLV | 3 |
| 61 | 5GSM congestion re-attempt indicator | 5GSM congestion re-attempt indicator | O | TLV | 3 |

In a first aspect, an apparatus for wireless communication includes a memory and a processor coupled to the memory. The processor is configured to send a data session establishment request to establish a data session with a network device using a wireless communication network. The data session establishment request has a first field to indicate a requested network slice for the data session. The processor is further configured to receive an indication of a granted network slice for the data session and to receive an indication of a back-off timer value from the network device. The processor is further configured to send a first message associated with the granted network slice after expiration of a back-off timer based on the back-off timer value and to send a second message having a second field corresponding to the first field of the data session establishment request after the expiration of the back-off timer based on the back-off timer value.

In a second aspect alternatively or in addition to the first aspect, the processor is further configured to delay sending the first message and the second message during a time interval that begins upon initiating operation of the back-off timer and that ends upon the expiration of the back-off timer.

In a third aspect alternatively or in addition to one or more of the first through second aspects, the data session establishment request includes a first single network slice selection assistance information (S-NSSAI) indicating the requested network slice, and the processor is further configured to receive a data session establishment acceptance message that includes a second S-NSSAI indicating the granted network slice.

In a fourth aspect alternatively or in addition to one or more of the first through third aspects, the memory is configured to store an indication of the requested network slice, and the processor is further configured to access the indication to determine that operation of the back-off timer applies to the requested network slice.

In a fifth aspect alternatively or in addition to one or more of the first through fourth aspects, the data session establishment request does not indicate any requested network slice.

In a sixth aspect alternatively or in addition to one or more of the first through fifth aspects, the processor is further configured to send a data session modification request to the network device to request modification of the data session.

In a seventh aspect alternatively or in addition to one or more of the first through sixth aspects, the processor is further configured to detect that the back-off timer value is greater than zero and to initiate operation of the back-off timer in response to detecting that the back-off timer value is greater than zero.

In an eighth aspect alternatively or in addition to one or more of the first through seventh aspects, the indication of the back-off timer value is included in a data session release command.

In a ninth aspect alternatively or in addition to one or more of the first through eighth aspects, the indication of the back-off timer value is included in a data session modification rejection message.

In a tenth aspect alternatively or in addition to one or more of the first through ninth aspects, the processor is further configured to receive a cause value indicating either a first type of the back-off timer value or a second type of the back-off timer value.

In an eleventh aspect alternatively or in addition to one or more of the first through tenth aspects, the first type indicates that the back-off timer value is associated with network slices, and the second type indicates that the back-off timer value is associated with network slices and data network names (DNNs).

In a twelfth aspect alternatively or in addition to one or more of the first through eleventh aspects, the processor is further configured to terminate operation of the back-off timer in response to detecting the expiration of the back-off timer.

In a thirteenth aspect alternatively or in addition to one or more of the first through twelfth aspects, a method of wireless communication includes sending, by a user equipment (UE) device, a data session establishment request to establish a data session with a network device using a wireless communication network. The data session establishment request has a first field to indicate a requested data network name (DNN) for the data session. The method further includes receiving, at the UE device, an indication of a granted DNN for the data session and receiving, at the UE device, an indication of a back-off timer value from the network device. The method further includes, after expiration of a back-off timer based on the back-off timer value, sending a first message associated with the granted DNN and sending a second message having a second field corresponding to the first field of the data session establishment request.

In a fourteenth aspect alternatively or in addition to one or more of the first through thirteenth aspects, the UE device delays sending the first message and the second message during a time interval that begins upon initiating operation of the back-off timer and that ends upon the expiration of the back-off timer.

In a fifteenth aspect alternatively or in addition to one or more of the first through fourteenth aspects, an apparatus for wireless communication includes a memory and a processor coupled to the memory. The processor is configured to receive a data session establishment request to establish a data session with a user equipment (UE) device using a wireless communication network and to send an indication of a granted network slice for the data session. The processor is further configured to send a congestion notification message indicating one or more network slices associated with a back-off timer value. The one or more network slices indicate one or both of the granted network slice or a requested network slice specified by the UE device. The processor is further configured to receive, in response to expiration of a back-off timer based on the back-off timer value, a message associated with at least one of the one or more network slices.

In a sixteenth aspect alternatively or in addition to one or more of the first through fifteenth aspects, the congestion notification message corresponds to a fifth-generation session management (5GSM) congestion re-attempt information element (IE).

In a seventeenth aspect alternatively or in addition to one or more of the first through sixteenth aspects, the congestion notification message includes a first bit having either a first value indicating that the back-off timer value is applicable to a public land mobile network (PLMN) registered to the UE device or a second value indicating that the back-off timer value is applicable to multiple PLMNs.

In an eighteenth aspect alternatively or in addition to one or more of the first through seventeenth aspects, the congestion notification message includes a second bit having either a first value indicating that the back-off timer value is applicable to the requested network slice or a second value indicating that the back-off timer value is applicable to the granted network slice.

In a nineteenth aspect alternatively or in addition to one or more of the first through eighteenth aspects, the congestion notification message includes a second bit and a third bit. The second bit has either a first value indicating that the back-off timer value is inapplicable to the requested network slice or a second value indicating that the back-off timer value is applicable to the requested network slice. The third bit has either a first value indicating that the back-off timer value is inapplicable to the granted network slice or a second value indicating that the back-off timer value is applicable to the granted network slice.

In a twentieth aspect alternatively or in addition to one or more of the first through nineteenth aspects, the congestion notification message includes a plurality of bits having either a first set of values indicating that the back-off timer value is applicable to the requested network slice, a second set of values indicating that the back-off timer value is applicable to the granted network slice, or a third set of values indicating that back-off timer value is applicable to both the requested network slice and the granted network slice.

In a twenty-first aspect alternatively or in addition to one or more of the first through twentieth aspects, the data session establishment request includes a first single network slice selection assistance information (S-NSSAI) indicating the requested network slice, and the processor is further configured to send a data session establishment acceptance message that includes a second S-NSSAI indicating the granted network slice.

In a twenty-second aspect alternatively or in addition to one or more of the first through twenty-first aspects, the data session establishment request does not indicate any requested network slice.

In a twenty-third aspect alternatively or in addition to one or more of the first through twenty-second aspects, the processor is further configured to receive a data session modification request from the UE device.

In a twenty-fourth aspect alternatively or in addition to one or more of the first through twenty-third aspects, the processor is further configured to send a data session release command to the UE device.

In a twenty-fifth aspect alternatively or in addition to one or more of the first through twenty-fourth aspects, the congestion notification message is included in data session release command.

In a twenty-sixth aspect alternatively or in addition to one or more of the first through twenty-fifth aspects, the congestion notification message is included in a data session modification rejection message.

In a twenty-seventh aspect alternatively or in addition to one or more of the first through twenty-sixth aspects, the processor is further configured to send a cause value indicating either a first type of the back-off timer value or a second type of the back-off timer value. The first type indicates that the back-off timer value is associated with network slices, and the second type indicates that the back-off timer value is associated with network slices and data network names (DNNs).

In a twenty-eighth aspect alternatively or in addition to one or more of the first through twenty-seventh aspects, the data session includes a protocol data unit (PDU) data session.

In a twenty-ninth aspect alternatively or in addition to one or more of the first through twenty-eighth aspects, a method of wireless communication includes receiving, by a network device, a data session establishment request to establish a data session with a user equipment (UE) device using a wireless communication network. The method further includes sending, by the network device, an indication of a granted data network name (DNN) for the data session and sending, by the network device, a congestion notification message indicating one or more DNNs associated with a back-off timer value. The one or more DNNs indicate one or both of the granted DNN or a requested DNN specified by the UE device. The method further includes receiving, at the network device in response to expiration of a back-off timer based on the back-off timer value, a message associated with at least one of the one or more DNNs.

In a thirtieth aspect alternatively or in addition to one or more of the first through twenty-ninth aspects, the congestion notification message corresponds to a fifth-generation session management (5GSM) congestion re-attempt information element (IE).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein may include processors, electronics devices, hardware devices, electronics components, logical circuits, memories, software codes, firmware codes, etc., or any combination thereof. Those of skill would further appreciate that the various illustrative logical blocks, modules, circuits, and operations described herein may be implemented as electronic hardware, computer software, or combinations of both. To illustrate, various illustrative components, blocks, modules, circuits, and operations have been described above generally in terms of their functionality. Whether such functionality is implemented as hardware or software depends upon the particular application and design of the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or process described herein may be implemented using hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In some implementations, the functions described may be implemented in hardware, software, firmware, or any combination thereof. If implemented in software, the functions may be stored on or transmitted over as one or more instructions or code on a computer-readable medium. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. An apparatus for wireless communication, the apparatus comprising:
   a memory; and
   a processor coupled to the memory and configured to:
      send a data session establishment request to establish a data session with a network device using a wireless communication network, the data session establishment request having a first field to indicate a requested network slice for the data session;
      receive an indication of a granted network slice for the data session;
      receive an indication of a back-off timer value;
      receive, in accordance with a quantity of default session management functions (SMFs) associated with the wireless communication network exceeding a threshold quantity of SMFs, a notification including a first bit indicating whether the back-off timer value is applicable to the requested network slice and further including a second bit whether the back-off timer value is applicable to the granted network slice, wherein the granted network slice is different than the requested network slice; and
      send, after expiration of a back-off timer associated with the back-off timer value, a first message associated with the granted network slice and a second message having a second field corresponding to the first field of the data session establishment request.

2. The apparatus of claim 1, wherein the processor is further configured to delay sending the first message and the second message during a time interval that begins upon initiating operation of the back-off timer and that ends upon the expiration of the back-off timer.

3. The apparatus of claim 1, wherein the data session establishment request includes a first single network slice selection assistance information (S-NSSAI) indicating the requested network slice, and wherein the processor is further configured to receive a data session establishment acceptance message that includes a second S-NSSAI indicating the granted network slice.

4. The apparatus of claim 1, wherein the memory is configured to store an indication of the requested network slice, and wherein the processor is further configured to access the indication to determine that operation of the back-off timer applies to the requested network slice.

5. The apparatus of claim 1, wherein the data session establishment request does not indicate any requested network slice.

6. The apparatus of claim 1, wherein the processor is further configured to send a data session modification request to the network device to request modification of the data session.

7. The apparatus of claim 1, wherein the processor is further configured to detect that the back-off timer value is greater than zero and to initiate operation of the back-off timer in response to detecting that the back-off timer value is greater than zero.

8. The apparatus of claim 1, wherein the indication of the back-off timer value is included in a data session release command.

9. The apparatus of claim 1, wherein the indication of the back-off timer value is included in a data session modification rejection message.

10. The apparatus of claim 1, wherein the processor is further configured to receive a cause value indicating either a first type of the back-off timer value or a second type of the back-off timer value.

11. The apparatus of claim 10, wherein the first type indicates that the back-off timer value is associated with network slices, and wherein the second type indicates that the back-off timer value is associated with network slices and data network names (DNNs).

12. The apparatus of claim 1, wherein the processor is further configured to:
prior to the expiration of the back-off timer, receive user input indicating an operation associated with one or more of the first message or the second message; and
in accordance with receiving the user input prior to the expiration of the back-off timer, initiate an alert to a user indicating to the user that the operation is subject to the expiration of the back-off timer.

13. The apparatus of claim 12, wherein the alert indicates a value of the back-off timer to the user, the value of the back-off timer corresponding to an amount of time until the operation is to be completed, and wherein the amount of time is in accordance with the back-off timer value.

14. The apparatus of claim 1, wherein the notification indicates that the requested network slice is unavailable and that the granted network slice is to be used instead of the requested network slice upon the expiration of the back-off timer.

15. The apparatus of claim 1, wherein, in accordance with the quantity of default SMFs associated with the wireless communication network failing to exceed the threshold quantity of SMFs, the back-off timer value is applicable on a multi-slice basis to both the requested network slice and the granted network slice, and wherein, in accordance with the quantity of default SMFs associated with the wireless communication network exceeding the threshold quantity of SMFs, the back-off timer value is individually applicable on a per-slice basis to the requested network slice via the first bit and to the granted network slice via the second bit.

16. A method of wireless communication, the method comprising:
sending, by a user equipment (UE) device, a data session establishment request to establish a data session with a network device using a wireless communication network, the data session establishment request having a first field to indicate a requested data network name (DNN) for the data session;
receiving, at the UE device, an indication of a granted DNN for the data session;
receiving, at the UE device, an indication of a back-off timer value;
receiving, in accordance with a quantity of default session management functions (SMFs) associated with the wireless communication network exceeding a threshold quantity of SMFs, a notification including a first bit indicating whether the back-off timer value is applicable to the requested DNN and further including a second bit indicating whether the back-off timer value is applicable to the granted DNN, wherein the granted DNN is different than the requested DNN;
after expiration of a back-off timer associated with the back-off timer value, sending a first message associated with the granted DNN; and
after the expiration of a back-off timer associated with the back-off timer value, sending a second message having a second field corresponding to the first field of the data session establishment request.

17. The method of claim 16, wherein the UE device delays sending the first message and the second message during a time interval that begins upon initiating operation of the back-off timer and that ends upon the expiration of the back-off timer.

18. An apparatus for wireless communication by a network device, the apparatus comprising:
a memory; and
a processor coupled to the memory and configured to:
receive a data session establishment request to establish a data session with a user equipment (UE) device using a wireless communication network;
send an indication of a granted network slice for the data session;
send, in accordance with a quantity of default session management functions (SMFs) associated with the wireless communication network exceeding a threshold quantity of SMFs, a congestion notification message including a first bit indicating whether a back-off timer value is applicable to a requested network slice and further including a second bit indicating whether the back-off timer value is applicable to the granted network slice, wherein the granted network slice is different than the requested network slice; and
receive, in response to expiration of a back-off timer associated with the back-off timer value, a first message associated with the requested network slice and a second message associated with the granted network slice.

19. The apparatus of claim 18, wherein the congestion notification message further includes a third bit having one of a first value indicating that the back-off timer value is applicable to a public land mobile network (PLMN) registered to the UE device or a second value indicating that the back-off timer value is applicable to multiple PLMNs.

20. The apparatus of claim 18, wherein the first bit has one of a first value to indicate that the back-off timer value is inapplicable to the requested network slice or a second value to indicate that the back-off timer value is applicable to the requested network slice, and wherein the second bit has one of the first value to indicate that the back-off timer value is inapplicable to the granted network slice or the second value to indicate that the back-off timer value is applicable to the granted network slice.

21. The apparatus of claim 18, wherein the congestion notification message is included in a data session release command.

22. The apparatus of claim 18, wherein the congestion notification message is included in a data session modification rejection message.

23. The apparatus of claim 18, wherein the processor is further configured to send a cause value indicating either a first type of the back-off timer value or a second type of the back-off timer value, wherein the first type indicates that the back-off timer value is associated with network slices, and wherein the second type indicates that the back-off timer value is associated with network slices and data network names (DNNs).

24. A method of wireless communication, the method comprising:
  receiving, by a network device, a data session establishment request to establish a data session with a user equipment (UE) device using a wireless communication network;
  sending, by the network device, an indication of a granted data network name (DNN) for the data session;
  sending, by the network device and in accordance with a quantity of default session management functions (SMFs) associated with the wireless communication network exceeding a threshold quantity of SMFs, a congestion notification message including a first bit indicating whether a back-off timer value is applicable to a requested DNN and further including a second bit indicating whether the back-off timer value is applicable to the granted DNN, wherein the granted DNN is different than the requested DNN;
  in response to expiration of a back-off timer associated with the back-off timer value, receiving, by the network device, a first message associated the requested DNN; and
  in response to the expiration of the back-off timer associated with the back-off timer value, receiving, by the network device, a second message associated with the granted DNN.

25. The method of claim 24, wherein the congestion notification message corresponds to a fifth-generation session management (5GSM) congestion re-attempt information element (IE).

\* \* \* \* \*